(12) United States Patent
Matsutani et al.

(10) Patent No.: US 12,315,163 B2
(45) Date of Patent: May 27, 2025

(54) DYNAMIC IMAGE ANALYSIS APPARATUS AND STORAGE MEDIUM

(71) Applicant: Konica Minolta, Inc., Tokyo (JP)

(72) Inventors: Noritsugu Matsutani, Musashino (JP); Tatsuya Takagi, Mitaka (JP); Kenta Shimamura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 360 days.

(21) Appl. No.: 17/654,808

(22) Filed: Mar. 14, 2022

(65) Prior Publication Data

US 2022/0301170 A1 Sep. 22, 2022

(30) Foreign Application Priority Data

Mar. 17, 2021 (JP) ................. 2021-043730

(51) Int. Cl.
  *G06T 7/00* (2017.01)
  *G06T 7/215* (2017.01)
  *G06T 7/223* (2017.01)
  *G06V 10/94* (2022.01)

(52) U.S. Cl.
  CPC ............ *G06T 7/0016* (2013.01); *G06T 7/215* (2017.01); *G06T 7/223* (2017.01); *G06V 10/955* (2022.01); *G06T 2207/30061* (2013.01); *G06V 2201/031* (2022.01)

(58) Field of Classification Search
  CPC ....... G06T 7/0016; G06T 7/215; G06T 7/223; G06T 2207/20021; G06T 2207/10116; G06T 2207/10016; G06T 2207/30061; G06T 2201/031; G06V 10/955
  See application file for complete search history.

(56) References Cited

U.S. PATENT DOCUMENTS 9,665,935 B2 * 5/2017 Yamato .................. G06V 10/44

FOREIGN PATENT DOCUMENTS

| JP | 2015-136566 A | 7/2015 |
| JP | 2016-067832 A | 5/2016 |
| JP | 2019-088565 A | 6/2019 |
| JP | 2019-180899 A | 10/2019 |
| WO | 2014/185197 A1 | 11/2014 |

OTHER PUBLICATIONS

Notice of Reasons for Refusal ("Communication") dated Oct. 1, 2024, issued for the corresponding Japanese Patent Application No. 2021-043730, 9 pages, with English translation.
Office Action, dated Apr. 8, 2025, issued for the corresponding Japanese Patent Application No. 2021-043730, 9 pages, with English translation.

* cited by examiner

Primary Examiner — Tuan H Nguyen
(74) Attorney, Agent, or Firm — LUCAS & MERCANTI, LLP

(57) ABSTRACT

A dynamic image analysis apparatus includes a hardware processor; and an outputter. The hardware processor obtains a dynamic image of a chest portion obtained by dynamic imaging by radiation. The hardware processor performs a first generating process in which information regarding pleural adhesion is generated based on a motion amount in a region including at least a region adjacent to a rib cage in a lung region in the dynamic image. The outputter outputs the generated information regarding the pleural adhesion.

9 Claims, 15 Drawing Sheets

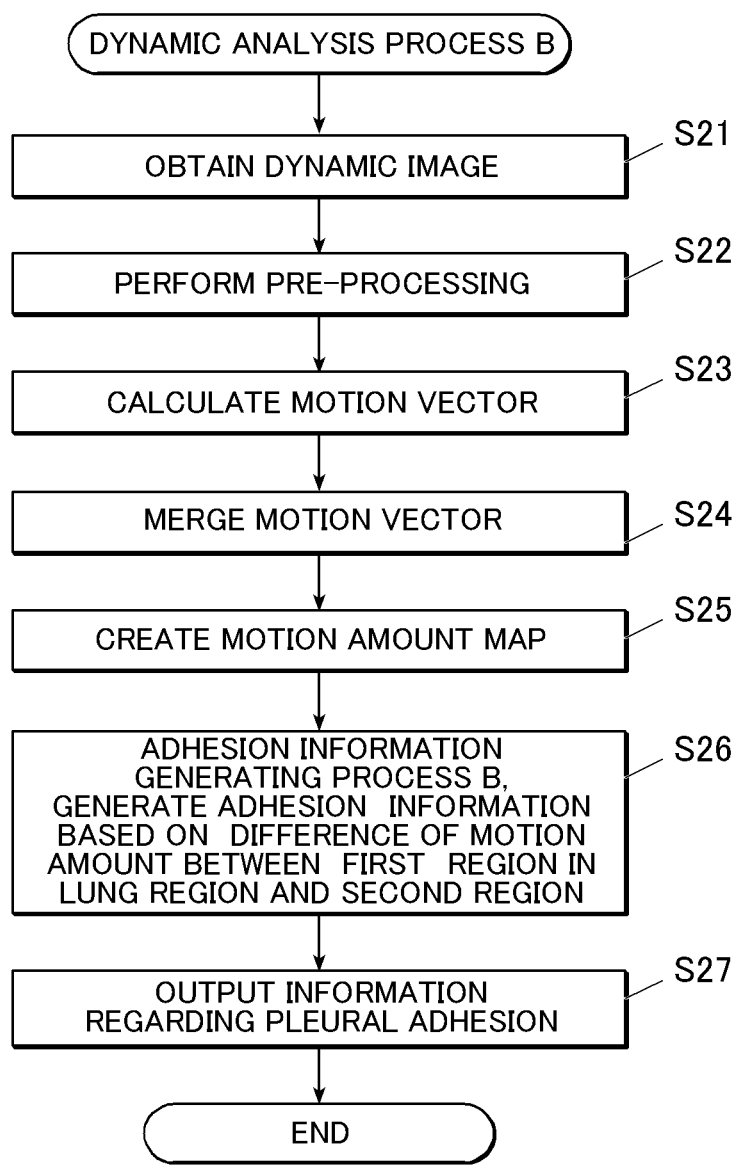

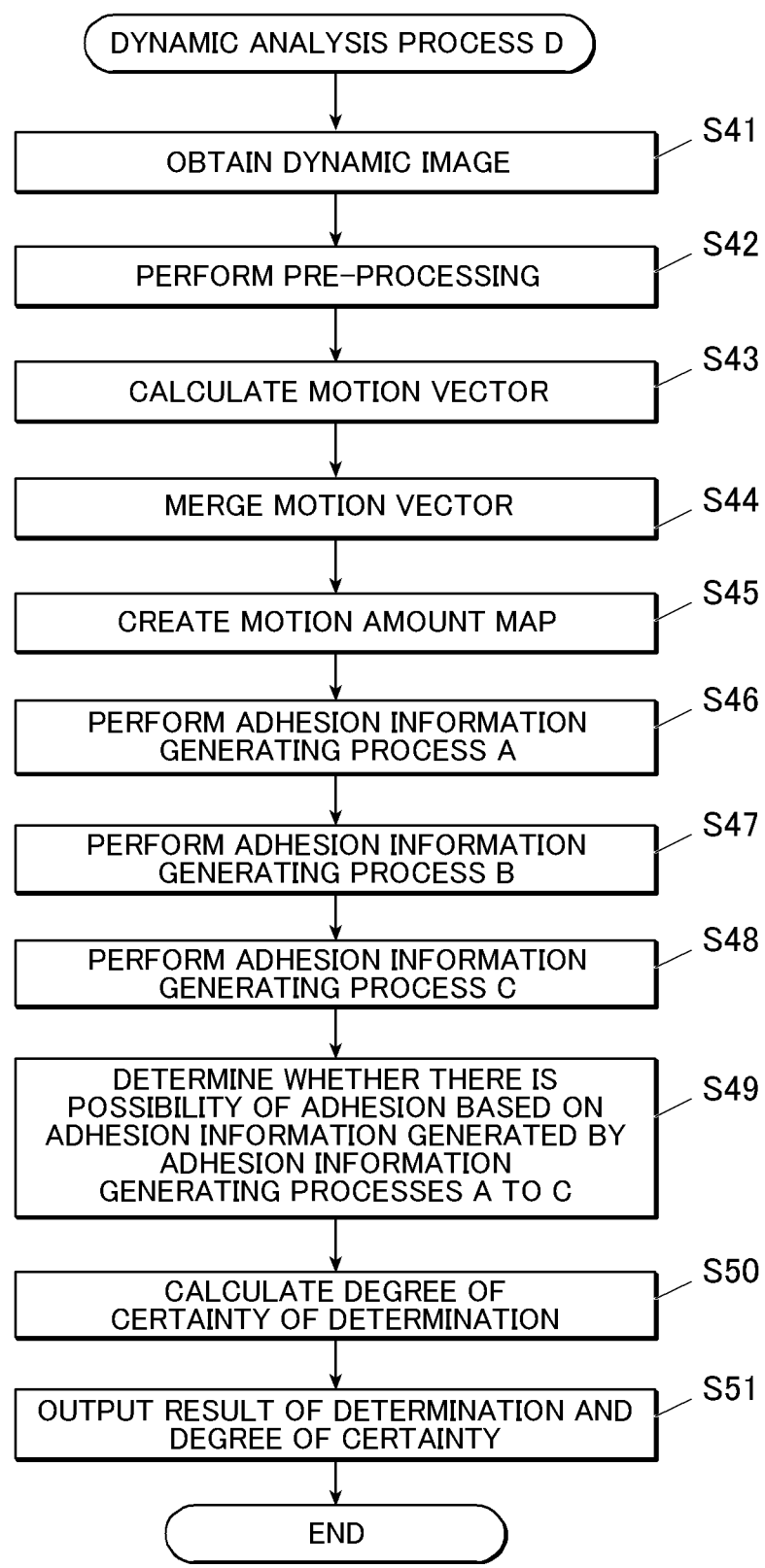

DYNAMIC IMAGE ANALYSIS APPARATUS AND STORAGE MEDIUM

CROSS-REFERENCE TO RELATED APPLICATIONS

The entire disclosure of Japanese Patent Application No. 2021-043730 filed on Mar. 17, 2021 is incorporated herein by reference in its entirety.

BACKGROUND

Technological Field

The present invention relates to a dynamic image analysis apparatus and a storage medium.

Description of the Related Art

As a technique to evaluate before surgery whether there is adhesion among biological tissues and the location of such adhesion, for example, JP 2016-67832 describes collecting static images of two time phases of inhaling and exhaling using a CT device, and using the collected static images of two time phases in order to evaluate pleural adhesion. For example, JP 2019-180899 describes obtaining a three-dimensional motion vector and calculating a slippage degree for a pair of voxels on the inside and outside of a lung surface physically close in three-dimensional CT image data (4D data) collected over time, and extracting a moving portion and a non-moving portion in a region on an outline of a lung region based on the slippage degree. For example, JP 2019-88565 describes obtaining motion vectors of two structures that are close physically and that have close positions in the image in the ultrasound image, and calculating a degree of adhesion between the two structures.

However, the CT device and 4D-CT are difficult to be introduced in typical medical facilities from the viewpoint of costs of the device. Moreover, from the viewpoints of complexity of the imaging procedure and the amount of exposure to radiation, there is a problem that it is difficult to apply these devices on a typical patient before surgery. The ultrasound diagnostic apparatus images locally, and the entire subject cannot be viewed. Therefore, it takes a great amount of time to image the entire subject. Moreover, the technique for imaging with the ultrasound diagnostic apparatus is difficult. Therefore, similarly, it is difficult to apply the ultrasound diagnostic apparatus to the typical patient before surgery.

As a method to solve the above problems, there are well-known techniques such as the techniques described in WO 2014/185197 and JP 2015-136566. WO 2014/185197 describes detecting adhesion based on a change in a shape of a diaphragm in a dynamic image. JP 2015-136566 describes detecting adhesion from misalignment of a phase regarding displacement of the diaphragm and a respiratory phase.

SUMMARY

However, according to the techniques described in WO 2014/185197 and JP 2015-136566, the adhesions that are not shown by the change in the shape of the diaphragm and the displacement of the diaphragm cannot be detected.

The present invention is made in view of the above problems, and the purpose of the present invention is to obtain information regarding pleural adhesion with a small amount of exposure to radiation and in a simple and accurate manner.

To achieve at least one of the abovementioned objects, according to an aspect of the present invention, a dynamic image analysis apparatus reflecting one aspect of the present invention includes: a hardware processor; and an outputter, wherein, the hardware processor obtains a dynamic image of a chest portion obtained by dynamic imaging by radiation, wherein the hardware processor performs a first generating process in which information regarding pleural adhesion is generated based on a motion amount in a region including at least a region adjacent to a rib cage in a lung region in the dynamic image, and wherein the outputter outputs the generated information regarding the pleural adhesion.

A dynamic image analysis apparatus includes: a hardware processor; and an outputter, wherein the hardware processor obtains a dynamic image of a chest portion obtained by dynamic imaging by radiation, wherein the hardware processor performs a second generating process in which information regarding pleural adhesion is generated based on a difference or ratio between the motion amount in a first region in the lung region in the dynamic image and the motion amount in a second region different from the first region, and wherein the outputter outputs the generated information regarding the pleural adhesion.

A dynamic image analysis apparatus includes: a hardware processor; and an outputter, wherein the hardware processor obtains a dynamic image of a chest portion obtained by dynamic imaging by radiation, wherein the hardware processor performs a third generating process in which information regarding pleural adhesion is generated based on a motion amount in a region not including a region adjacent to a rib cage in a lung region in the dynamic image, and wherein the outputter outputs the generated information regarding the pleural adhesion.

A non-transitory computer-readable storage medium storing a program causing a computer to perform: obtaining a dynamic image of a chest portion obtained by dynamic imaging by radiation; generating information regarding pleural adhesion based on a motion amount in a region including at least a region adjacent to rib cage in a lung region in the dynamic image; and outputting the generated information regarding the pleural adhesion.

A non-transitory computer-readable storage medium storing a program causing a computer to perform: obtaining a dynamic image of a chest portion obtained by dynamic imaging by radiation; generating information regarding pleural adhesion based on a difference or a ratio between a motion amount in a first region in the lung region in the dynamic image and a motion amount in a second region different from the first region; and outputting the generated information regarding the pleural adhesion.]

A non-transitory computer-readable storage medium storing a program causing a computer to perform: obtaining a dynamic image of a chest portion obtained by dynamic imaging by radiation; generating information regarding pleural adhesion based on a motion amount in a region not including a region adjacent to a rib cage in a lung region in the dynamic image; and outputting the generated information regarding the pleural adhesion.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 15 is a flowchart showing a dynamic analysis process B performed by the controller of the diagnostic console shown in FIG. 1 according to the second embodiment;

FIG. 22 is a flowchart showing a dynamic analysis process D performed by the controller of the diagnostic console shown in FIG. 1 according to the fourth embodiment.

DETAILED DESCRIPTION OF THE EMBODIMENTS

Hereinafter, one or more embodiments of the present invention will be described with reference to the drawings. However, the scope of the present invention is not limited to the embodiments or illustrated examples.

First Embodiment

[Configuration of Dynamic Analysis System 100]

First, the configuration according to the present embodiment is described.

Figure 1:
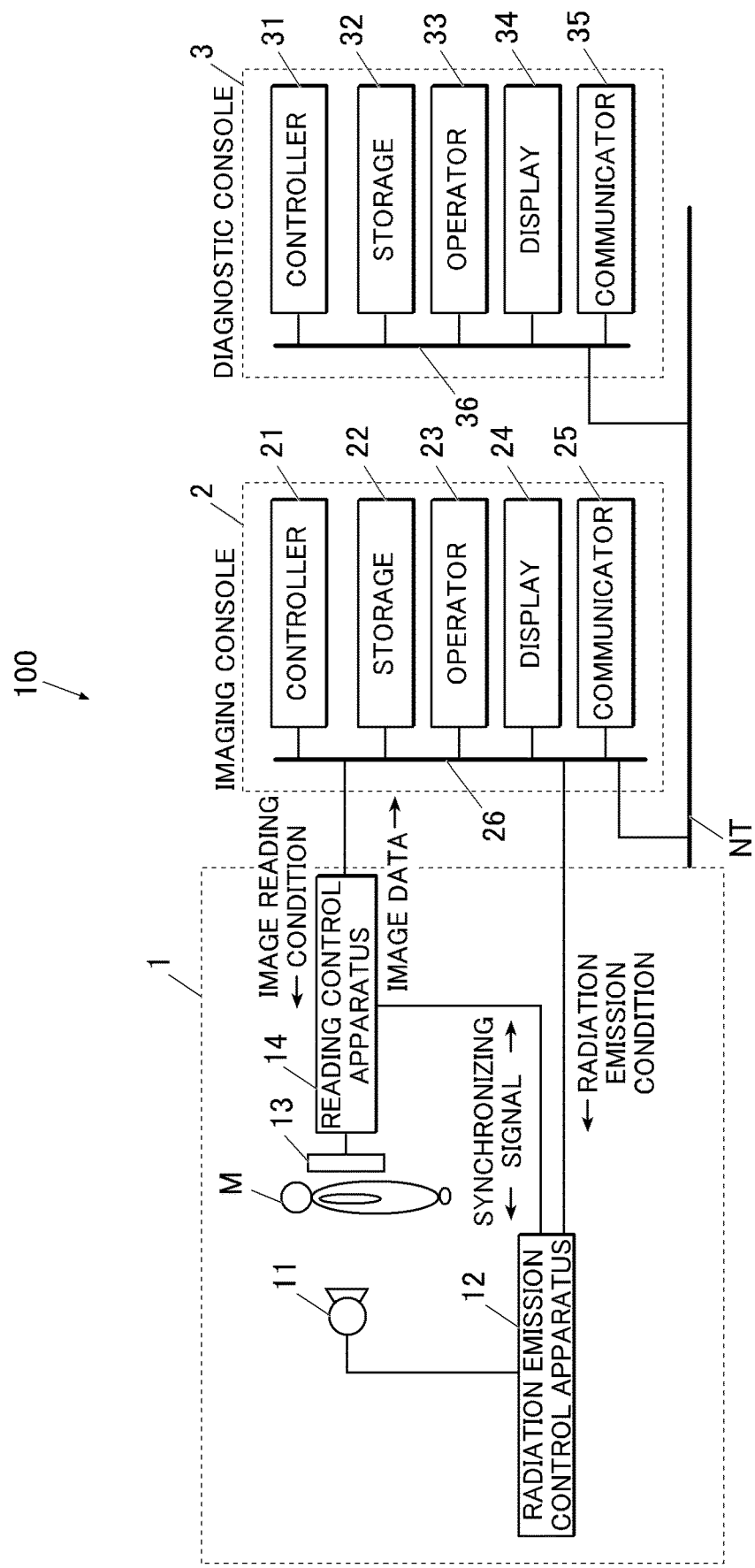
FIG. 1 is a diagram showing an entire configuration of a dynamic analysis system according to an embodiment of the present invention.

FIG. 1 shows an example of an entire configuration of a dynamic analysis system 100 according to the present embodiment.

As shown in FIG. 1, the dynamic analysis system 100 includes an imaging apparatus 1, an imaging console 2 connected to the imaging apparatus 1 through a communication cable, etc., and a diagnostic console 3 connected to the imaging console 2 through a communication network NT such as a LAN (Local Area Network). These components of the dynamic analysis system 100 are in conformity with DICOM (Digital Image and Communications in Medicine) standard and communicate with one another in conformity with DICOM.

[Configuration of Imaging Apparatus 1]

The imaging apparatus 1 is an imager that images a cyclic dynamic state of a chest portion of a subject, for example. Examples of the cyclic dynamic state include, change in shape of the lungs by expansion and contraction of the lungs due to respiratory movement, and pulsation of the heart. Dynamic imaging is performed by repeatedly emitting pulsed radiation, such as pulsed X-rays, to a subject at predetermined time intervals (pulse emission) or continuously emitting radiation without interruption to a subject at a low dose rate (continuous emission), thereby obtaining a plurality of images showing the dynamic state of the subject. A series of images obtained by dynamic imaging is called a dynamic image. That is, the dynamic image is a three-dimensional image including a time axis. The dynamic image includes moving images but does not include images that are obtained by imaging still images while displaying the moving image. Each of the plurality of images constituting the dynamic image is called frame images.

In the embodiments described hereinafter, dynamic imaging of the front of the chest is performed by pulse emission as an example.

A radiation source 11 is disposed to face a radiation detector 13 having a subject M in between, and emits radiation (X-rays) to the subject M under the control of a radiation emission control apparatus 12.

The radiation emission control apparatus 12 is connected to the imaging console 2, and controls the radiation source 11 on the basis of radiation emission conditions input from the imaging console 2 so as to perform radiation imaging. The radiation emission conditions input from the imaging console 2 include a pulse rate, a pulse width, a pulse interval, the number of frames (frame images) to be taken by one imaging, a value of current of an X-ray tube, a value of voltage of the X-ray tube, and a type of added filter. The pulse rate is the number of times radiation is emitted per second, and matches the frame rate described below. The pulse width is an amount of time that the radiation is emitted for one radiation emission. The pulse interval is an amount of time from the start of one radiation emission to the start of the next radiation emission, and matches the frame interval described below.

The radiation detector 13 includes a semiconductor image sensor such as a Flat Panel Detector (FPD). The FPD is constituted of detection elements (pixels) arranged in a matrix at predetermined positions on a substrate, such as a glass substrate. The detection elements detect radiation that is emitted from the radiation source 11 and that is passed through at least a subject M according to the intensity of radiation, and convert the detected radiation into electric signals. The electric signals are accumulated in the FPD. The pixels are provided with switches, such as TFTs (Thin Film Transistors). As the FPD, there are an indirect conversion type FPD that converts X-rays into electric signals with a photoelectric conversion element through a scintillator and a direct conversion type FPD that directly converts X-rays into electric signals. Either of them can be used.

The radiation detector 13 is provided to face the radiation source 11 with the subject M in between.

A reading control apparatus 14 is connected to the imaging console 2. The reading control apparatus 14 controls the switches of the pixels of the radiation detector 13 based on image reading conditions input from the imaging console 2 and switches the reading of the electric signal accumulated in each pixel. The electric signal accumulated in the radiation detector 13 is read and with this, the image data is obtained. This image data is a frame image. Then, the reading control apparatus 14 outputs the obtained frame image to the imaging console 2. The image reading conditions include, a frame rate, a frame interval, a pixel size, and an image size (matrix size), for example. The frame rate is the number of frame images obtained in each second, and matches the pulse rate. The frame interval is an amount of time from the start of obtaining one frame image to the start of obtaining the next frame image and matches the pulse interval.

Here, the radiation emission control apparatus 12 and the reading control apparatus 14 are connected to each other. The radiation emission control apparatus 12 and the reading control apparatus 14 exchange synchronizing signals with each other so that a radiation emission operation is synchronized with an operation of reading the image.

[Configuration of Imaging Console 2]

The imaging console 2 outputs the radiation emission conditions and the image reading conditions to the imaging apparatus 1 so as to control the radiation imaging and the radiation image reading operations performed by the imaging apparatus 1, and also displays the dynamic image obtained by the imaging apparatus 1 so that a radiographer, such as a radiologist, can check positioning, and also can determine if the dynamic image is suitable for diagnosis.

As shown in FIG. 1, the imaging console 2 includes a controller 21, a storage 22, an operator 23, a display 24, and a communicator 25, and the units are connected to each other through a bus 26.

The controller 21 includes a CPU (Central Processing Unit), a RAM (Random Access Memory), and the like. The CPU of the controller 21 reads a system program and various process programs stored in the storage 22 in response to operation on the operator 23, and deploys the read programs in the RAM. The CPU of the controller 21 performs various processes, such as the imaging control process described below, in accordance with the deployed programs. With this, the CPU of the controller 21 centrally controls the operation by the components of the imaging console 2 and the radiation emission operation and the reading operation of the imaging apparatus 1.

The storage 22 includes a nonvolatile semiconductor memory, a hard disk or the like. The storage 22 stores various programs executed by the controller 21, parameters necessary to perform the process executed by the program, and data such as processing results. For example, the storage 22 stores a program to execute the imaging control process shown in FIG. 2. The storage 22 also stores the radiation emission conditions and the image reading conditions associated with an examination target site and imaging direction. Various programs are stored in a form of a computer readable program code, and the controller 21 sequentially executes the operation in accordance with the program code.

The operator 23 includes a keyboard including cursor keys, number input keys and various function keys, and a pointing device such as a mouse, and outputs to the controller 21 instruction signals input by key operation on the keyboard or by mouse operation. The operator 23 may include a touch panel on the display screen of the display 24. In this case, the operator 23 outputs instruction signals input through the touch panel to the controller 21.

The display 24 includes a monitor, such as an LCD (Liquid Crystal Display) or a CRT (Cathode Ray Tube). The display 24 displays instructions input on the operator 23, data, and the like according to the instructions of display signals input from the controller 21.

The communicator 25 includes a LAN adapter, a modem, a TA (Terminal Adapter) and the like, and controls data transmission and reception with other devices connected to a communication network NT.

[Configuration of Diagnostic Console 3]

The diagnostic console 3 is a dynamic image analysis apparatus that obtains a dynamic image of a chest portion from the imaging console 2 and generates and outputs information regarding pleural adhesions based on the obtained dynamic image.

As shown in FIG. 1, the diagnostic console 3 includes a controller 31 (hardware processor), a storage 32, an operator 33, a display 34, and a communicator 35, and the units are connected to each other through a bus 36.

The controller 31 includes a CPU, a RAM, and the like. In response to the operation on the operator 33, the CPU of the controller 31 reads the system program and various processing programs stored in the storage 32, and deploys the program in the RAM. In accordance with the deployed program, the CPU of the controller 31 executes various processes such as a dynamic analysis process A described below, and centrally controls the operation of the units in the diagnostic console 3. The controller 31 executes the dynamic analysis process A and functions as an obtainer and a generator.

The storage 32 includes a nonvolatile semiconductor memory, a hard disk, or the like. The storage 32 stores various programs such as the program to execute the dynamic analysis process A by the controller 31, parameters necessary to perform the process executed by the program, and data such as processing results. Various programs are stored in a form of a computer readable program code, and the controller 31 sequentially executes the operation in accordance with the program code.

The operator 33 includes a keyboard including cursor keys, number input keys and various function keys, and a pointing device such as a mouse, and outputs to the controller 31 instruction signals input by key operation on the keyboard or by mouse operation that are performed by the user. The operator 33 may include a touch panel on the display screen of the display 34. In this case, the operator 33 outputs instruction signals input through the touch panel to the controller 31.

The display 34 includes a monitor, such as an LCD or a CRT. The display 34 performs various display according to the instructions of display signals input from the controller 31. The display 34 functions as the outputter.

The communicator 35 includes a LAN adapter, a modem, a TA (Terminal Adapter) and the like, and controls data transmission and reception with other devices connected to the communication network NT.

[Operation of Dynamic Analysis System 100]

Next, the operation of the dynamic analysis system 100 according to the present embodiment is described.

[Operation of Imaging Apparatus 1 and Imaging Console 2]

First, imaging operation by the imaging apparatus 1 and the imaging console 2 is described.

Figure 2:
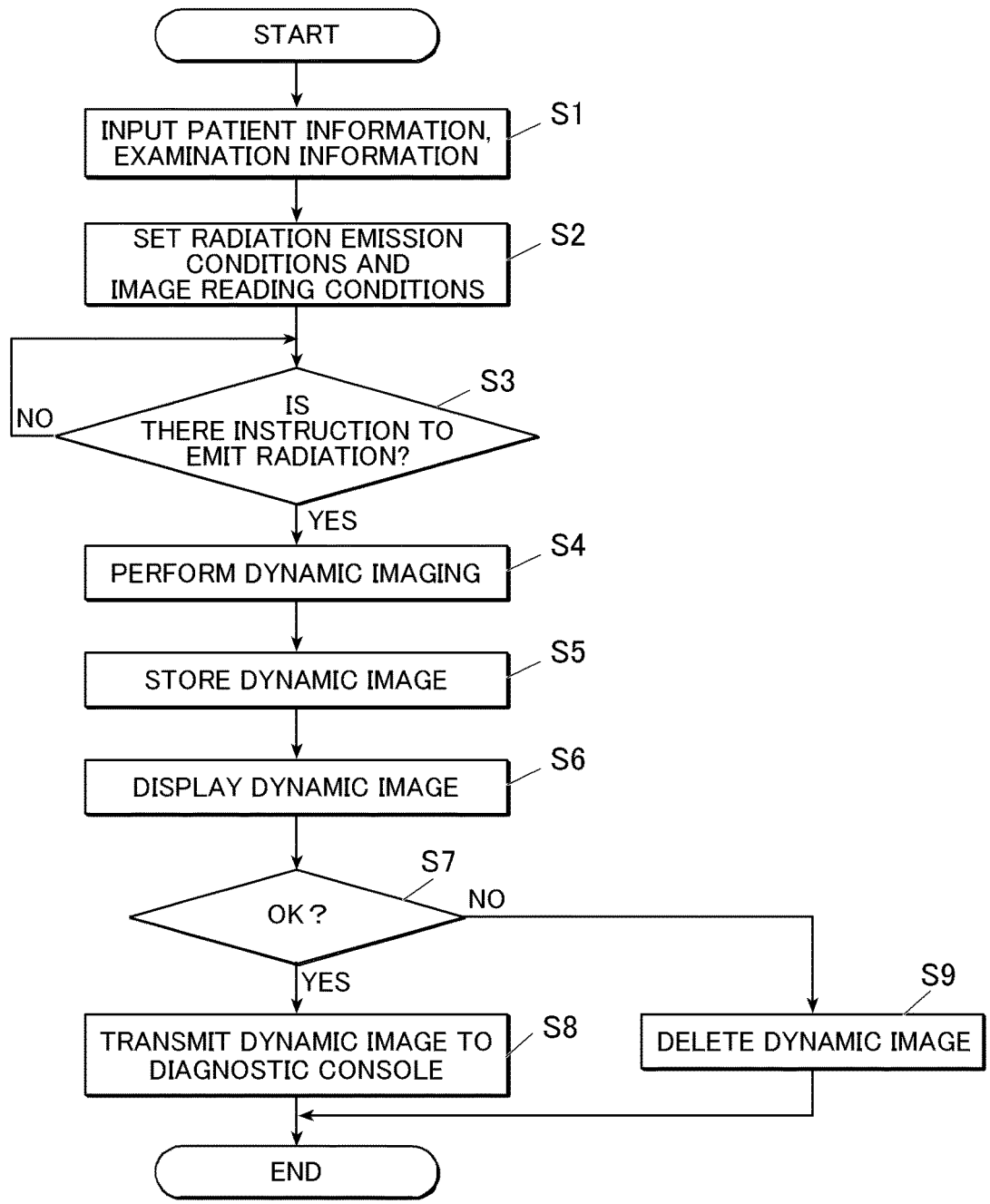
FIG. 2 is a flowchart showing an imaging control process performed by a controller of an imaging console shown in FIG. 1.

FIG. 2 shows the imaging control process performed in the controller 21 of the imaging console 2. The imaging control process is performed by the controller 21 in coordination with the program stored in the storage 22.

First, the controller 21 receives input of patient information and examination information for a subject M by the person performing the imaging by operation on the operator 23 (step S1).

Next, the controller 21 reads the radiation emission conditions from the storage 22 and sets the conditions in the radiation emission control apparatus 12. The controller 21 also reads the image reading conditions from the storage 22 and sets the conditions in the reading control apparatus 14 (step S2).

Next, the controller 21 stands by for the instruction to emit radiation input by operation on the operator 23 (step S3). Here, the person who performs the imaging positions the subject M between the radiation source 11 and the radiation detector 13 and performs positioning. When preparations for imaging are complete, the person who performs the imaging operates the operator 23 and inputs the radiation emission instruction.

When the radiation emission instruction is input on the operator 23 (step S3; YES), the controller 21 outputs the imaging start instruction to the radiation emission control apparatus 12 and the reading control apparatus 14 and starts dynamic imaging (step S4). That is, the radiation is emitted from the radiation source 11 at pulse intervals set in the radiation emission control apparatus 12, and the radiation detector 13 obtains frame images. During the dynamic imaging, the person who performs the imaging provides guidance in breathing such as "breathe in" or "breathe out", and images the chest portion in a breathing state. The imaging apparatus 1 may include a sound outputter or a display, and when the imaging start instruction is output, sound or display to guide breathing such as "breathe in" or "breathe out" may be provided.

When an instruction to end emission of radiation is input on the operator 23, the controller 21 outputs an instruction to the radiation emission control apparatus 12 and the reading control apparatus 14 to end imaging, and the imaging operation stops.

The frame images obtained by the imaging are successively input to the imaging console 2. The controller 21 stores in the storage 22 the input frame images associated with numbers (frame numbers) showing the order of imaging (step S5). The controller 21 also displays the frame images on the display 24 (step S6). The person who performs the imaging checks the position in the displayed dynamic image, and determines whether an image suitable for diagnosis is obtained by the imaging (imaging OK) or imaging needs to be performed again (imaging NG). Then, the operator 23 is operated to input the determination result.

When the determination result showing imaging OK is input by predetermined operation on the operator 23 (step S7; YES), the controller 21 adds to each frame image in the series of frame images obtained by the dynamic imaging the following information such as, an identification ID to identify the dynamic image, patient information, examination information, radiation emission conditions, image reading conditions, and numbers showing the order of imaging (frame number) (for example, writing in a header region of the image data in DICOM format). Then, the controller 21 transmits the resulting frame images to the diagnostic console 3 through the communicator 25 (step S8). Then, the imaging control process ends. When the determination result showing imaging NG is input by predetermined operation on the operator 23 (step S7; NO), the controller 21 deletes the series of frame images stored in the storage 22 (step S9) and ends the imaging control process. In this case, imaging needs to be performed again.

(Operation of Diagnostic Console 3)

Next, the operation on the diagnostic console 3 is described.

Figure 3:
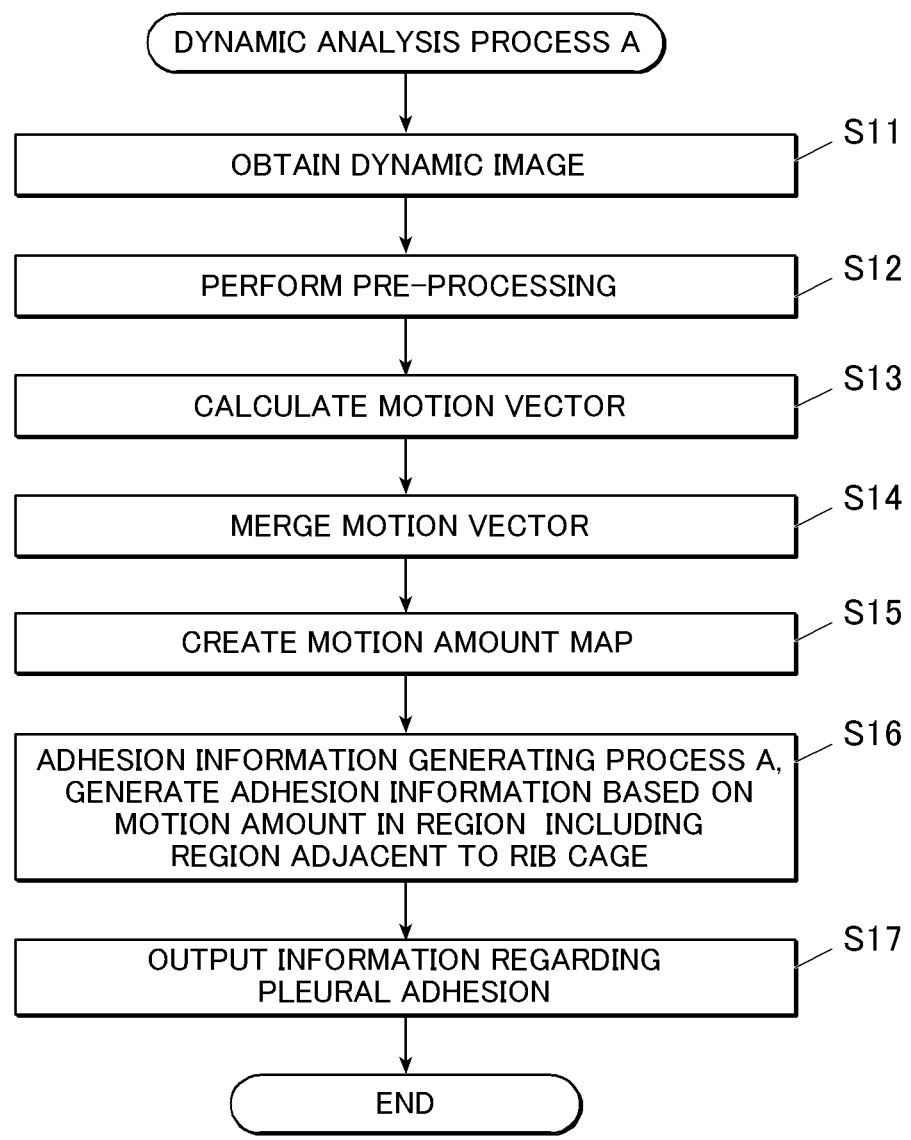
FIG. 3 is a flowchart showing a dynamic analysis process A performed by a controller of a diagnostic console shown in FIG. 1 according to the first embodiment.

In the diagnostic console 3, when the series of frame images of the dynamic image imaging the chest portion is received from the imaging console 2 through the communicator 35, the dynamic analysis process A shown in FIG. 3 is performed by the controller 31 in coordination with the program stored in the storage 32.

Here, the rib cage and the diaphragm are containers for the soft lungs. When a person desires to breathe, and the rig cage and the diaphragm are moved, the lungs expand and contract due to change in internal pressure. With this, the air flows in and out. In the respiratory movement, the lungs expand and contract due to the vertical movement of the diaphragm and the spreading and narrowing of the rib cage.

Normally, the rib cage and the lungs are separated. However, if adhesion between a wall pleura which is the inner membrane of the rib cage and a visceral pleura which surrounds the lungs (pleural adhesion) occurs due to inflammation or other factors, the rib cage and lungs are strongly attached at the location of the adhesion. Therefore, a motion amount of the visceral pleura at the portion where there is adhesion decreases compared to a motion amount of the surrounding areas.

Therefore, in the dynamic analysis process A, the dynamic image of the chest portion is analyzed. Based on a motion amount of the region including at least the region adjacent to the rib cage in the lung region of the dynamic image (rib cage on the side of the body), the information regarding the pleural adhesion is generated and output.

The dynamic analysis process A is described with reference to FIG. 3.

First, the controller 31 obtains the dynamic image received by the communicator 35 (step S11).

Next, the controller 31 performs preprocessing on the obtained dynamic images (step S12).

In the preprocessing, the controller 31 obtains the frame image in a section that is to be the target of analysis (used for generating the information regarding pleural adhesion) from the obtained dynamic image.

For example, the controller 31 obtains the frame images of an expiratory period (for example, from a maximum inspiratory level to a maximum expiratory level) of the dynamic image as the frame images of the section that is to be the target of analysis. The frame images of the expiratory period can be obtained, for example, by recognizing a lung region from the frame images of the dynamic image and extracting the frame images from when the area of the recognized lung region is maximum (local maximum) to when the area of the recognized lung region is minimum (local minimum) Alternatively, the distance from the apex of the lung to the diaphragm is measured from the frame images of the dynamic image, and the frame images in the section in which the distance between the apex of the lung and the diaphragm is maximum (local maximum) to minimum (local minimum) can be obtained as the frame images of the expiratory period. Alternatively, the frame images in the section in which a density of the lung region in the dynamic image (average density) is maximum (local maximum) to minimum (local minimum) can be obtained as the frame images of the inspiratory period. The user may specify the section which is to be the target of analysis.

Figure 4:
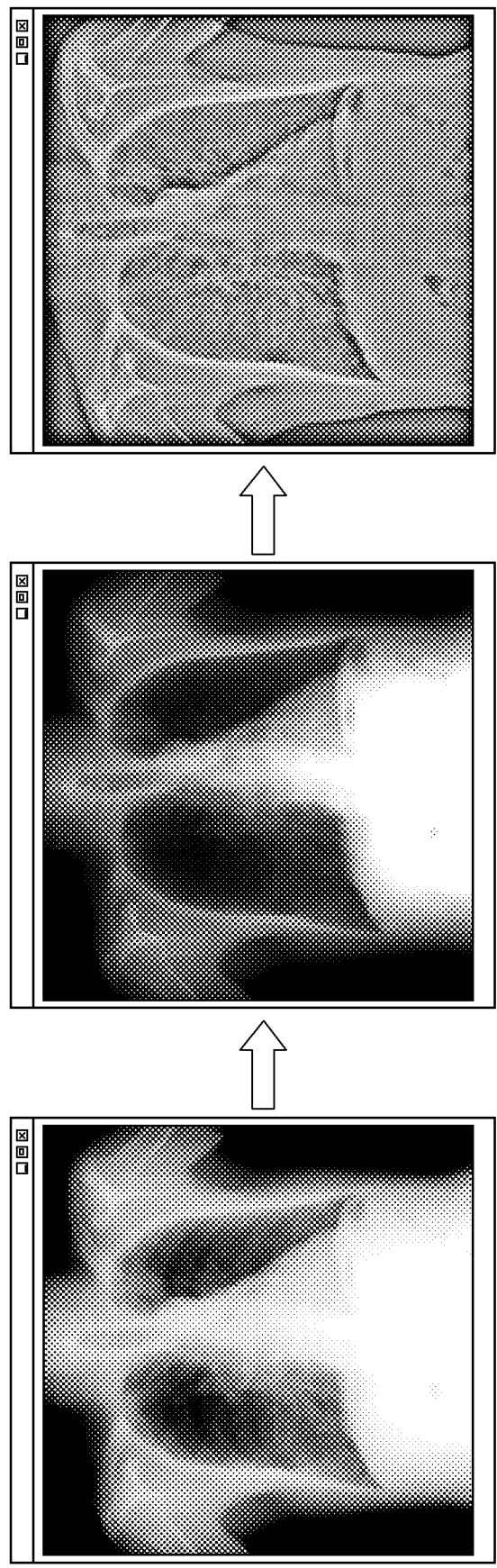
FIG. 4 is a diagram describing pre-processing.

Next, as shown in FIG. 4, the controller 31 performs on the obtained frame images (original image) a Bone Suppression Process (BS process) in which a bone region is recognized and signal components of the bone is reduced. With this, bone suppression images (BS images) are generated. The controller 31 performs a frequency emphasizing process on the generated BS images and obtains frequency emphasized images.

Here, not only the lungs but also various structures such as ribs are shown on a single image in each frame image of the dynamic image of the chest portion. Therefore, in order to extract motion vectors of the lungs, if corresponding points of patterns on the images are simply calculated, the points are mixed with the corresponding points of the bone which moved differently from the lungs. By performing the bone suppression process on the original image, the corresponding points in the lung region can be accurately calculated in the later stage of the processes. Further, the pattern in the lung region that can be seen in the dynamic image is mainly pulmonary blood vessels and these are high frequency components. Characteristics of organs, fat, and muscles outside the lungs appear in the low frequency components. Therefore, it is preferable to perform in advance the frequency enhancing process which enhances specific high frequency components corresponding to the pulmonary blood vessels.

Next, the controller 31 performs an optical flow between frame images adjacent in a time direction (hereinafter referred to as adjacent frame images) in the frame images that are pre-processed and that are in the analysis target section. For each small region, the controller 31 obtains the corresponding points between the adjacent frame images and calculates the motion vector (step S13).

For example, a first frame in the analysis section (for example, maximum inspiratory level frame, called frame 1) is divided into a plurality of small regions. According to a dense-type optical flow, for each small region, the corresponding points between the adjacent frame images are sequentially obtained and the motion vector is calculated. The small region can be each pixel or each pixel block (for example, 5 mm×5 mm) including a plurality of pixels. When the small region is the pixel block, for example, the motion vector of the center of the small region is calculated. According to the present embodiment, the example in which the small region is the pixel block which is 5 mm×5 mm is described. Here, the motion vector between adjacent frame images is calculated. Alternatively, the motion vector between one frame image and another frame image n frames ahead (n is a positive integer) may be calculated. Moreover, in order to decrease errors when the motion is measured caused by the heart beat, n may be the number of frames in one cycle of the heart beat. The calculation of the motion vector is to be performed at least for each small region in the lung region. The motion amount in each small region of the lung region in the dynamic image is based on respiratory volume.

Next, for each small region, the controller 31 merges (integrates) a plurality of motion vectors obtained in step S13 (step S14).

Figure 5:
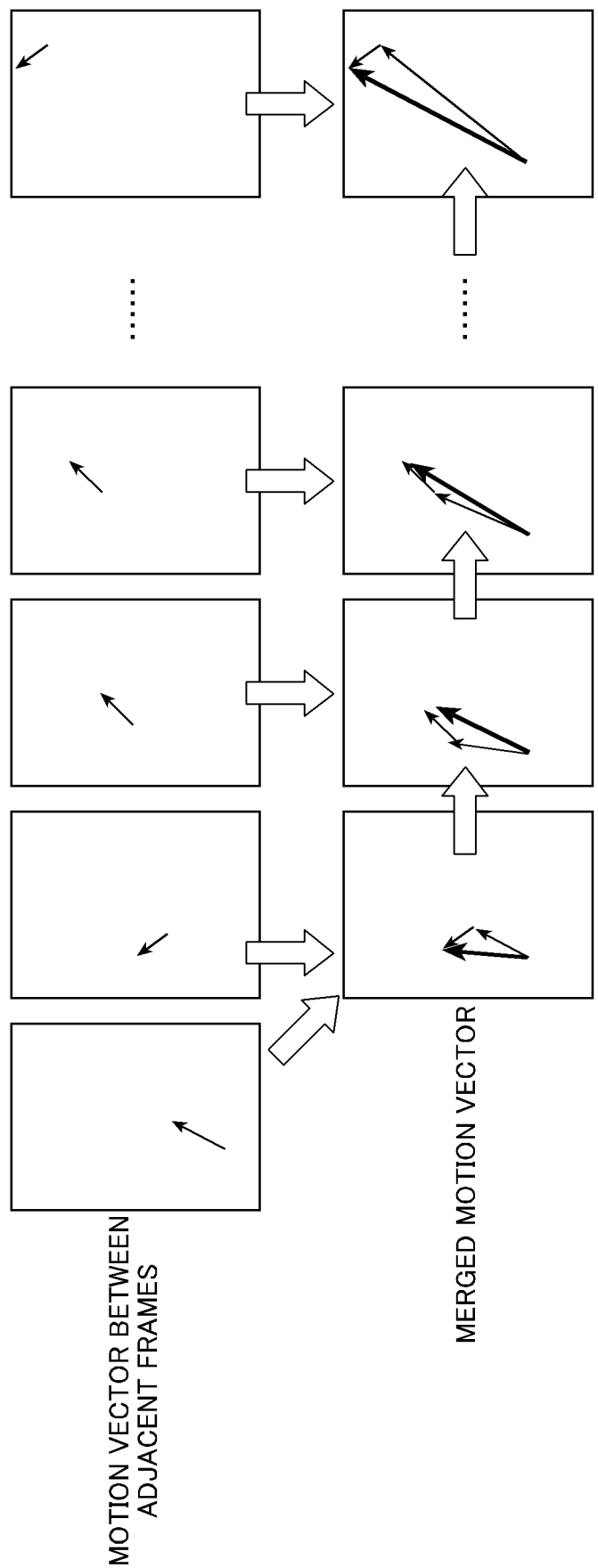
FIG. 5 is a diagram describing merging of motion vectors.

FIG. 5 is a diagram that describes a merging process in step S14. Here, the motion vectors from the start frame to the end frame are calculated. As shown in FIG. 5, first, in step S14, a sum of the motion vectors obtained in step S13 is calculated (shown with a thick arrow in FIG. 5), that is, the sum of the motion vector obtained from an image of the start frame (frame 1) and start frame adjacent frame image which is the image of the frame adjacent to the start frame (frame 1+n) and the motion vector obtained from the start frame adjacent frame image (frame 1+n) and frame image after the frame adjacent to the start frame (frame 2+n). Next, the sum of the calculated sum of the motion vector and the next motion vector is calculated. This is performed until all of the calculated motion vectors are added. With this, the motion vector showing the motion from the start frame image which is the analysis target to the end frame image can be calculated. Such motion vector is stored in vector start point coordinates or vector end point coordinates. For example, if the later-described reference frame image is the frame image of the maximum inspiratory level, the motion vector may be stored in the vector start point coordinates.

The above method to calculate the motion vector is one example. The method is not limited if, in the end, the motion vectors for each small region are calculated from the start frame image to the end frame image in the expiratory period. In a deep breathing period (about 5 seconds), the movement of the position and the deforming of the lungs due to the breathing is large. Therefore, the visual of the image changes drastically and it is very difficult to calculate the corresponding points on the image. Therefore, as described above, for example, the corresponding points are calculated in a unit of a short amount of time such as between frame images adjacent in a time direction, and the motion vector is calculated. These are merged so as to be able to accurately calculate the motion vector in the expiratory period. As post-processing of the calculated result of the motion vector, various filtering processes such as Gaussian filtering may be performed to remove noise.

Next, based on the calculated motion vector, the controller 31 calculates an amount of motion (length of motion vector) for each small region and creates a motion amount MAP showing the motion amount for each small region (step S15). When the motion amount MAP is created, among the motion vectors for each small region, the region outside the lung region may be removed as being outside of the target. In order to extract the lung region (lung field region), well-known methods such as the method using edge detection as described in JP 2018-148964 can be used.

Next, the controller 31 performs an adhesion information generating process A, refers to the motion amount MAP created in step S15, and based on the motion amount in the region including at least the region adjacent to the rib cage in the lung region, the information regarding pleural adhesion (adhesion information) is generated (step S16). Here, according to the present embodiment, the rib cage refers to the rib cage on the lateral side of the body. The region adjacent to the rib cage in the lung region refers to the region showing the visceral pleura, and the small region positioned on the outline (positioned at a boundary with the thorax) of the lung region on the pleural side in the dynamic image.

In the adhesion information generating process A in step S13, the controller 31 generates the information regarding pleural adhesion by any one or a combination of a plurality of the following first method to fourth method.

(First Method)

If there are pleural adhesions, the motion of the portion (small region) in the visceral pleura where there is adhesion becomes small.

In the first method, the controller 31 determines whether the motion amount is equal to or less than a predetermined threshold in each small region positioned on the outline of the lung region on the rib case side in the dynamic image. If the motion amount is determined to be equal to or less than the predetermined threshold, the information showing that the motion amount in the specific small region is equal to or less than the predetermined threshold, or information showing that the motion amount in the specific small region is decreased is stored corresponded with the specific small region in the RAM, etc. as the information regarding the pleural adhesion in the specific small region. If it is determined that the motion amount exceeds the predetermined threshold, information showing that the motion amount in the specific small region is not equal to or less than the predetermined threshold (exceeds the predetermined threshold) or information showing that the motion amount in the specific small region is not decreased is stored corresponded with the specific small region in the RAM, etc. as the information regarding the pleural adhesion in the specific small region.

A value verified in clinical experiments is used as the predetermined threshold compared with the motion amount in the small region.

(Second Method)

When there is a pleural adhesion, the motion of the portion (small region) where there is adhesion in the visceral pleura becomes small, and compared to the portion where there is no adhesion, the difference of the motion amount between the surrounding region becomes large.

In the second and third methods, the controller 31 determines whether the motion amount is decreased in the region showing the visceral pleura by comparing the motion amount in the region showing the visceral pleura in the dynamic image and the motion amount in the region in the lung region different from the visceral pleura. The result of the determination is generated as information regarding the pleural adhesion.

In the second method, the controller 31 calculates for each small region showing the visceral pleura in the dynamic image, that is, for each small region positioned on the outline of the lung region on the rib cage side in the dynamic image, the difference (or ratio, similar in the embodiments below) between the motion amount in a specific small region and the motion amount in the small region surrounding the specific small region in the lung region (for example, a small region with a distance from the specific small region in the lung region being within a predetermined threshold (for example, radius within 10 mm from the center of the small region)). The controller 31 determines whether the calculated difference (absolute value of difference, the same applies hereinafter) is equal to or larger than the predetermined threshold. If it is determined that the calculated difference is equal to or larger than the predetermined threshold, the controller 31 stores the information showing that the calculated difference is equal to or larger than the predetermined threshold or the information showing that the motion amount in the specific small region is decreased in the RAM, etc. as the information regarding the pleural adhesion in the specific small region. The information is stored corresponded with the specific small region. If it is determined that the calculated difference is smaller than the predetermined threshold, the controller 31 stores the information showing that the calculated difference is not equal to or larger than the predetermined threshold or the information showing that the motion amount in the specific small region is not decreased in the RAM, etc. as the information regarding the pleural adhesion in the specific small region. The information is stored corresponded with the specific small region.

A value verified in clinical experiments is used as the predetermined threshold compared with the above difference. The motion amount in the surrounding small region as described above is a representative value of the motion amount in the surrounding small regions (average value, median value, maximum value, the same applies below).

(Third Method)

Figure 6:
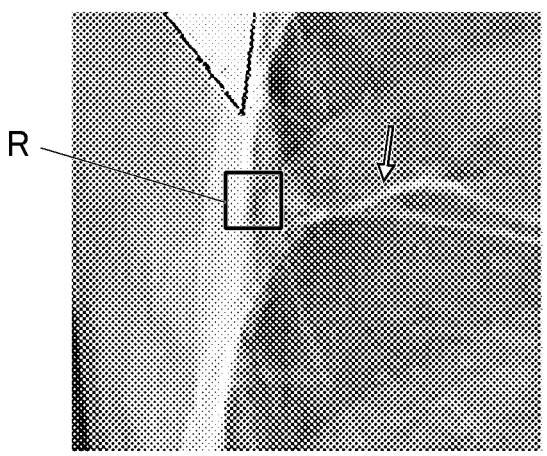
FIG. 6 is a diagram showing an example of a shadow continuous to a small region.

In the third method, the controller 31 first performs a process in each small region positioned on the outline of the lung region on the rib cage side in the dynamic image in order to detect a shadow continuous to a specific small region in the lung region. Here, the shadow continuous to the small region positioned on the outline of the lung region on the rib cage side refers to a band like opacity as shown with an arrow in the enlarged diagram of the lung region shown in FIG. 6. FIG. 6 shows the continuous shadows in the small region R on the outline of the lungs. For example, the shadow continuous to the small region can be detected by using a region expansion method to obtain a region in which the difference of the signal value between the specific small region as the base point positioned on the outline of the lung region on the rib cage side being within a predetermined threshold and by extracting from the region obtained above the region which is continuous with the above small region with the thickness being 2 mm to 3 mm. If the shadow continuous to the specific small region in the lung region is detected, the controller 31 calculates the difference between the motion amount in the specific small region and the motion amount in another small region on the shadow continuous to the specific small region in the lung region. The controller 31 determines whether the calculated difference is equal to or larger than the predetermined threshold. If it is determined that the calculated difference is equal to or larger than the predetermined threshold, the controller 31 stores the information showing that the calculated difference is equal to or larger than the predetermined threshold or the information showing that the motion amount in the specific small region is decreased in the RAM, etc. as the information regarding the pleural adhesion in the specific small region. The information is stored corresponded with the specific small region. If it is determined that the calculated difference is smaller than the predetermined threshold, the controller 31 stores the information showing that the calculated difference is not equal to or larger than the predetermined threshold or the information showing that the motion amount in the specific small region is not decreased in the RAM, etc. as the information regarding the pleural adhesion in the specific small region. The information is stored corresponded with the specific small region. A value verified in clinical experiments is used as the predetermined threshold compared with the above difference. Moreover, the motion amount in another small region on the shadow continuous to the small region is the representative value of the motion amount in another small region on the shadow continuous to the small region, for example.

(Fourth Method)

If there is pleural adhesion, the motion in the small region of the portion where there is adhesion in the visceral pleura becomes small, and there is a difference in the motion amount between such specific small region and another small region on the shadow continuous to the specific small region. Therefore, the variation of the motion amount becomes large in the region including the specific small region and another small region on the shadow continuous to the specific small region. In the fourth method, the information regarding the pleural adhesion is generated based on such variation.

For example, the controller 31 performs a process in each small region positioned on the outline of the lung region on the rib cage side in the dynamic image in order to detect the shadow continuous to a specific small region in the lung region. If the shadow is detected, for example, a standard deviation or a variance is calculated as the variation of the motion amount in the region including the specific small region and another small region on the shadow continuous to the specific small region. Then, it is determined whether the calculated variation is equal to or larger than the predetermined threshold. If it is determined that the calculated variation is equal to or larger than the predetermined threshold, the controller 31 stores the information showing that the calculated variation is equal to or larger than the predetermined threshold or the information showing that the motion amount in the specific small region is decreased in the RAM, etc. as the information regarding the pleural adhesion in the specific small region. The information is stored corresponded with the specific small region. If it is determined that the calculated variation is smaller than the predetermined threshold, the controller 31 stores the information showing that the calculated variation is not equal to or larger than the predetermined threshold or the information showing that the motion amount in the specific small region is not decreased in the RAM, etc. as the information regarding the pleural adhesion in the specific small region. The information is stored corresponded with the specific small region.

A value verified in clinical experiments is used as the predetermined threshold compared with the above variation. The method described in the third method can be used as the method to detect the shadow continuous to the small region.

(Combination of Two or More of the First Method to the Fourth Method)

As described above, the information regarding the pleural adhesion may be generated by any one of the first method to fourth method or a plurality of the methods may be combined to generate the information regarding the pleural adhesion. The method or the combination of methods used to generate the information regarding the pleural adhesion may be determined in advance or the user may set the method on the operator 33. Alternatively, the information regarding the pleural adhesion may be generated by a method according to the needs set by the user on the operator 33 such as a desire to enhance detection sensitivity (user does not want to overlook a person with adhesion) or to enhance specificity (user wants to carefully detect the person with adhesion). Described below are examples in which the information regarding the pleural adhesion is generated by combining a plurality of methods according to the needs set by the user.

Figure 7:
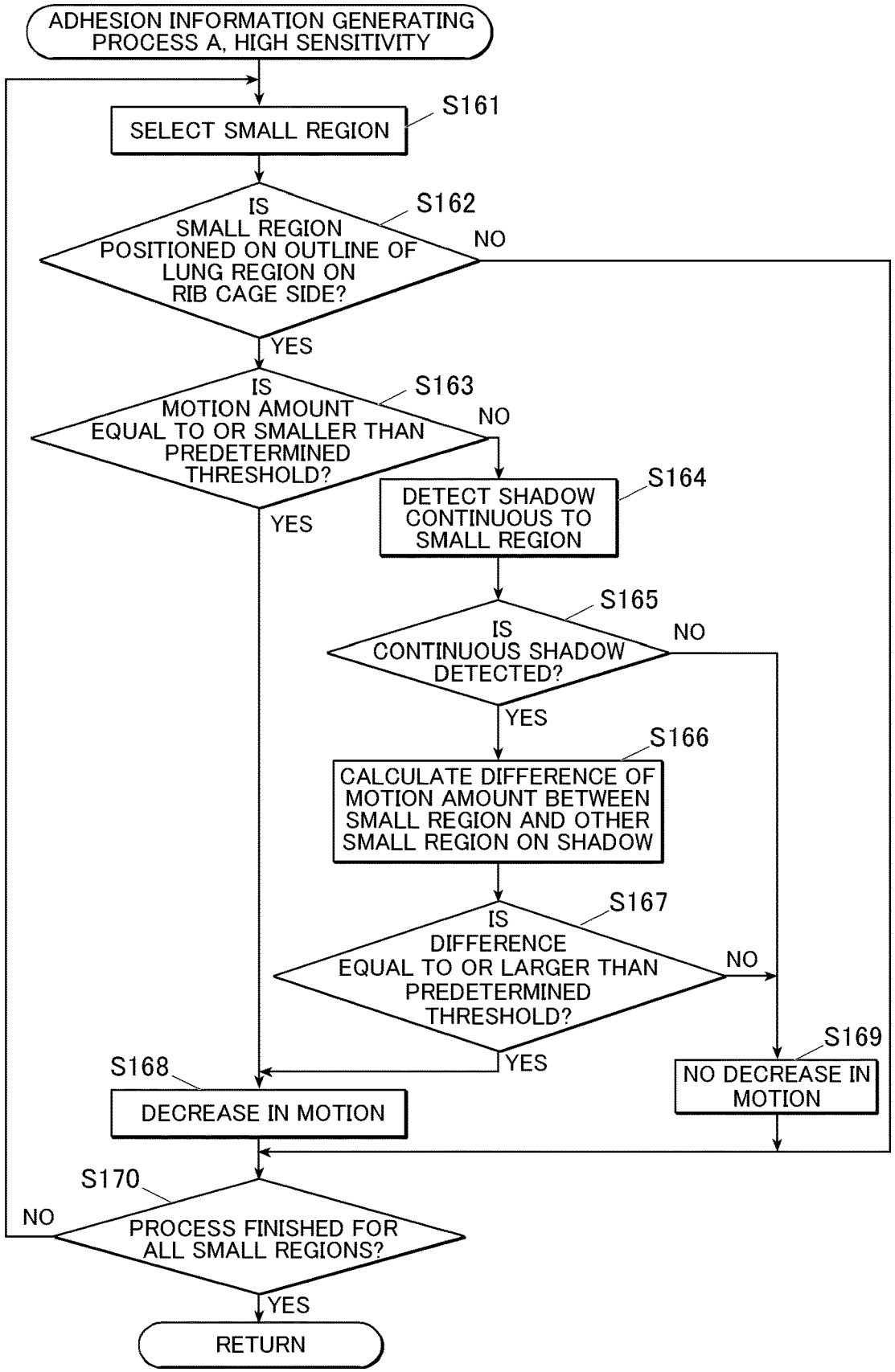
FIG. 7 is a flowchart showing an example of an adhesion information generating process A (high sensitivity) performed in step S16 shown in FIG. 3.

FIG. 7 is a flowchart showing a flow of the adhesion information generating process A (high sensitivity) performed when the user sets the needs to "enhance detection sensitivity". The adhesion information generating process A (high sensitivity) is performed by the controller 31 in coordination with a program stored in the storage 32.

First, the controller 31 selects one small region from the dynamic image (step S161).

Next, the controller 31 determines whether the selected small region is positioned on the outline of the lung region on the rib cage side (step S162).

If it is determined that the selected small region is not positioned on the outline of the lung region on the rib cage side (step S162; NO), the controller 31 progresses the process to step S170.

If it is determined that the selected small region is positioned on the outline of the lung region on the rib cage side (step S162; YES), the controller 31 determines whether the motion amount in the specific small region is equal to or smaller than the predetermined threshold (step S163).

If it is determined that the motion amount in the selected small region is equal to or smaller than the predetermined threshold (step S163; YES), the controller 31 determines that the motion of the selected small region is decreased. The controller 31 stores the information showing that the motion in the specific small region is decreased in the RAM, etc. as the information regarding the pleural adhesion in the specific small region. The information is stored corresponded with the specific small region (step S168). Then, the process progresses to step S170.

If it is determined that the motion amount in the selected small region is larger than the predetermined threshold (step S163; NO), the controller 31 performs the process to detect the shadow continuous to the specific selected small region in the lung region of the dynamic image (step S164).

Next, the controller 31 determines whether the shadow continuous to the specific selected small region is detected in the lung region of the dynamic image (step S165).

If it is determined that the shadow continuous to the specific selected small region is not detected in the lung region of the dynamic image (step S165; NO), the controller 31 determines that the motion amount in the selected small region is not decreased. The controller 31 stores the information showing that the motion amount in the specific small region is not decreased in the RAM, etc. as the information regarding the pleural adhesion in the specific small region. The information is stored corresponded with the specific small region (step S169). Then, the process progresses to step S170.

If it is determined that the shadow continuous to the specific selected small region is detected in the lung region in the dynamic image (step S165; YES), the controller 31 calculates the difference between the motion amount in the selected small region and the motion amount (representative value) of another small region on the shadow continuous to the selected small region (step S166).

Then, it is determined whether the calculated difference is equal to or larger than the predetermined threshold. If it is determined that the calculated difference is equal to or larger than the predetermined threshold (step S167; YES), the controller 31 determines that the motion amount in the selected small region is decreased. The controller 31 stores the information showing that the motion amount in the specific small region is decreased in the RAM, etc. as the information regarding the pleural adhesion in the specific small region. The information is stored corresponded with the small region (step S168). Then, the process progresses to step S170.

If it is determined that the calculated difference is smaller than the predetermined threshold (step S167; NO), the controller 31 determines that the motion amount in the selected small region is not decreased and stores information showing that the motion amount in the specific small region is not decreased in the RAM, etc. as the information regarding the pleural adhesion in the specific small region. The information is stored corresponded with the specific small region (step S169). Then, the process progresses to step S170.

In step S170, the controller 31 determines whether the processes in steps S161 to S169 are finished for all of the small regions (step S170).

If it is determined that the processes in steps S161 to S169 are not finished for all of the small regions (step S170; NO), the controller 31 returns to step S161, selects the small region in which the processes are not performed, and performs the processes in steps S161 to S169. If it is determined that the processes in steps S161 to S169 are finished for all of the small regions (step S170; YES), the controller 31 ends the adhesion information generating process A (high sensitivity).

In the adhesion information generating process A (high sensitivity) shown in FIG. 7, if the determination using the above-described first method is performed in step S163, and the result of the determination is YES, it is determined that the motion amount in the small region is decreased and the information regarding the pleural adhesion showing that the motion amount is decreased is generated. If the result of the determination is NO, the determination using the above-described third method is performed. If the result of the determination is YES, it is determined that the motion amount in the selected small region is decreased, and the information regarding the pleural adhesion showing that the motion amount is decreased is generated. If the result of the determination is NO, it is determined that the motion amount in the selected small region is not decreased and the information regarding the pleural adhesion showing that the motion amount is not decreased is generated. Therefore, it is possible to enhance the sensitivity of adhesion compared to when the information regarding the pleural adhesion is generated using only the first method or only the third method.

In the process shown in FIG. 7, the second method can be used instead of the first method. Alternatively, the fourth method can be used instead of the third method. Alternatively, all of the determinations in the first method to fourth method can be performed. If the determination results in all methods are NO, it is determined that the motion amount in the selected small region is not decreased. If there is even one determination result showing YES, it is determined that the motion amount in the selected small region is decreased and the determination result is generated as the information regarding the pleural adhesion.

Figure 8:
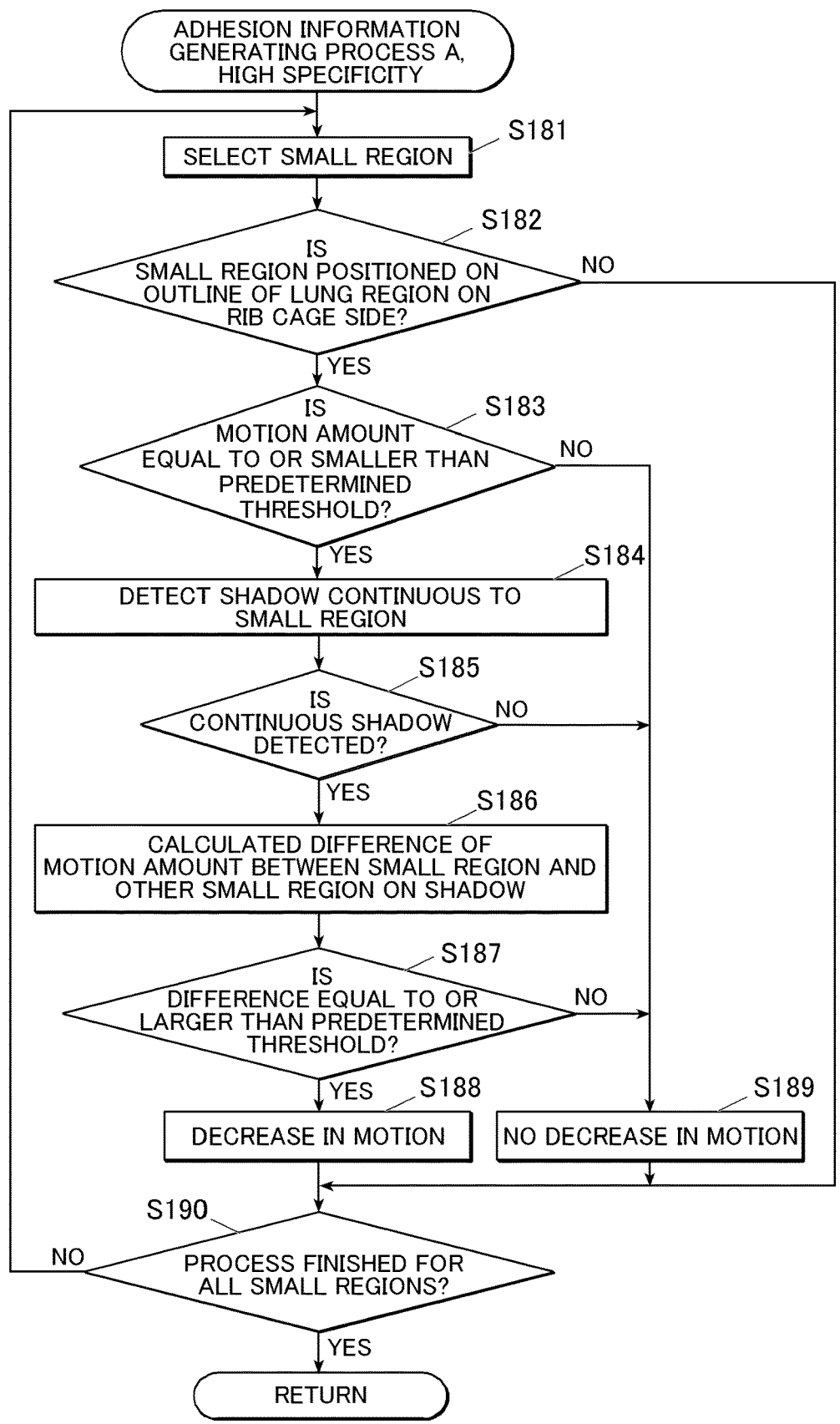
FIG. 8 is a flowchart showing an example of adhesion information generating process A (high specificity) performed in step S16 shown in FIG. 3.

FIG. 8 is a flowchart showing a flow of the adhesion information generating process A (high specificity) performed when the needs of the user is set to be "high specificity". The adhesion information generating process A (high specificity) is performed by the controller 31 in coordination with the program stored in the storage 32.

First, the controller 31 selects one small region from the dynamic image (step S181).

Next, the controller 31 determines whether the selected small region is positioned on the outline of the lung region on the rib cage side (step S182).

If it is determined that the selected small region is not positioned on the outline of the lung region on the rib cage side (step S182; NO), the controller 31 progresses the process to step S190.

If it is determined that the selected small region is positioned on the outline of the lung region on the rib cage side (step S182; YES), the controller 31 determines whether the motion amount in the specific small region is equal to or lower than the predetermined threshold (step S183).

If it is determined that the motion amount in the selected small region is more than the predetermined threshold (step S183; NO), the controller 31 determines that the motion in the selected small region is not decreased. The controller 31 stores the information showing that the motion in the specific small region is not decreased in the RAM, etc. as the information regarding the pleural adhesion in the specific small region. The information is stored corresponded with the specific small region (step S189). Then, the process progresses to step S190.

If it is determined that the motion amount in the selected small region is equal to or smaller than the predetermined threshold (step S183; YES), the controller 31 detects the shadow continuous with the specific selected small region in the lung region of the dynamic image (step S184). The method described in the third method can be used as the detection method in step S184.

Next, the controller 31 determines whether the shadow continuous with the specific selected small region is detected in the lung region of the dynamic image (step S185).

If it is determined that the shadow continuous with the specific selected small region is not detected in the lung region of the dynamic image (step S185; NO), the controller 31 determines that the motion amount in the selected small region is not decreased. The controller 31 stores the information showing that the motion amount in the specific small region is not decreased in the RAM, etc. as the information regarding the pleural adhesion in the specific small region. The information is stored corresponded with the specific small region (step S189). Then, the process progresses to step S190.

If it is determined that the shadow continuous to the specific selected small region is detected in the lung region of the dynamic image (step S185; YES), the controller 31 calculates the difference between the motion amount in the selected small region and the motion amount (representative value) in another small region on the shadow continuous to the selected small region (step S186).

Then, it is determined whether the calculated difference is equal to or larger than a predetermined threshold. If it is determined that the calculated difference is equal to or larger than the predetermined threshold (step S187; YES), the controller 31 determines that the motion amount in the selected small region is decreased. The controller 31 stores the information showing that the motion amount in the specific small region is decreased in the RAM, etc. as the information regarding the pleural adhesion in the specific small region. The information is stored corresponded with the specific small region (step S188). Then, the process progresses to step S190.

If it is determined that the calculated difference is less than the predetermined threshold (step S187; NO), the controller 31 determines that the motion amount in the selected small region is not decreased. The controller 31 stores the information showing that the motion amount in the specific small region is not decreased in the RAM, etc. as the information regarding the pleural adhesion in the specific small region. The information is stored corresponded with the specific small region (step S189). Then, the process progresses to step S190.

In step S190, the controller 31 determines whether the processes in steps S181 to S189 are finished for all of the small regions (step S190).

If it is determined that the processes in steps S181 to S189 are not finished for all of the small regions (step S190; NO), the controller 31 returns the process to step S181, selects the small region in which the process is not performed yet and performs the processes in steps S181 to S189. If it is determined that the processes in steps S181 to S189 are finished for all of the small regions (step S190; YES), the controller 31 ends the adhesion information generating process A (high specificity) shown in FIG. 8.

According to the adhesion information generating process A (high specificity) as shown in FIG. 8, in step S183, the determination using the above-described first method is performed. If the determination result is YES, the determination using the above-described third method is performed. If the determination result using the third method is YES, it is determined that the motion amount in the selected small region is decreased, and information regarding the pleural adhesion showing the above is generated. If the determination result using the first method is NO, or even if the determination result using the first method is YES, if the determination result using the third method is NO, it is determined that the motion amount in the selected small region is not decreased and the information regarding the pleural adhesion showing the above is generated. Therefore, it is possible to determine whether the motion amount is decreased more carefully than when the information regarding the pleural adhesion is generated using only the first method or only the third method, and it is possible to enhance the specificity of the adhesion.

In the process shown in FIG. 8, the second method can be used instead of the first method. Alternatively, the fourth method can be used instead of the third method. Alternatively, the determination of the first method to fourth method can all be performed, and if the determination result is YES in all methods, it may be determined that the motion amount in the selected small region is decreased. If there is even one determination result that is NO, it may be determined that the motion amount in the selected small region is not decreased. The above determination result may be generated as the information regarding the pleural adhesion.

Returning to FIG. 3, if the adhesion information generating process A in step S16 ends, the controller 31 outputs the generated information regarding the pleural adhesion (step S17).

The generated information regarding the pleural adhesion may be output as text or numeric values, or the information may be output with color added on an image according to the text or the numeric values.

Figure 9:
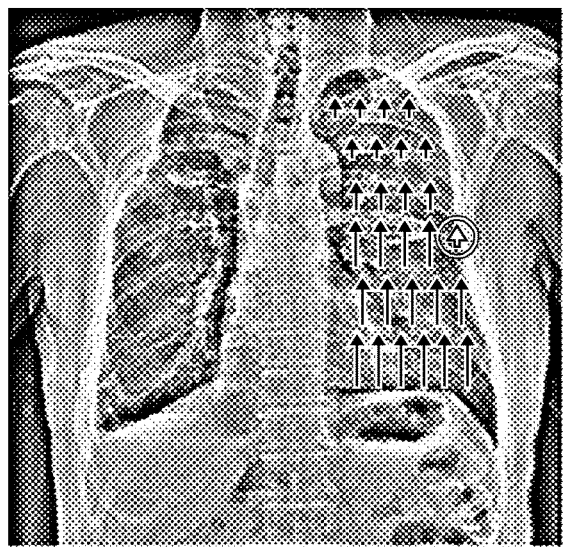
FIG. 9 is a diagram showing an output example of information regarding pleural adhesion according to the first embodiment.
Figure 10:
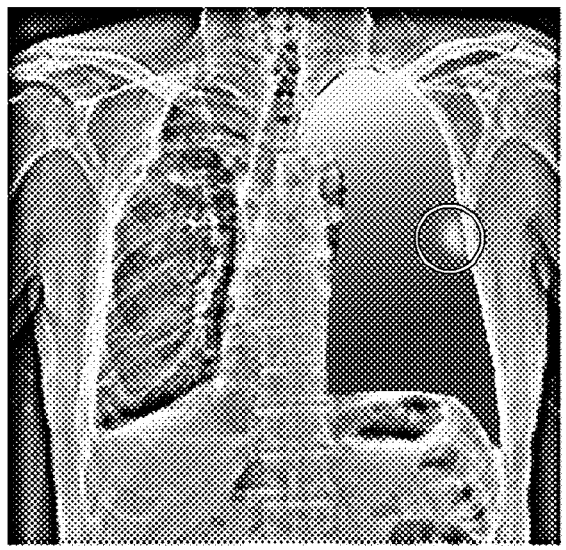
FIG. 10 is a diagram showing an output example of information regarding pleural adhesion according to the first embodiment.
Figure 11:
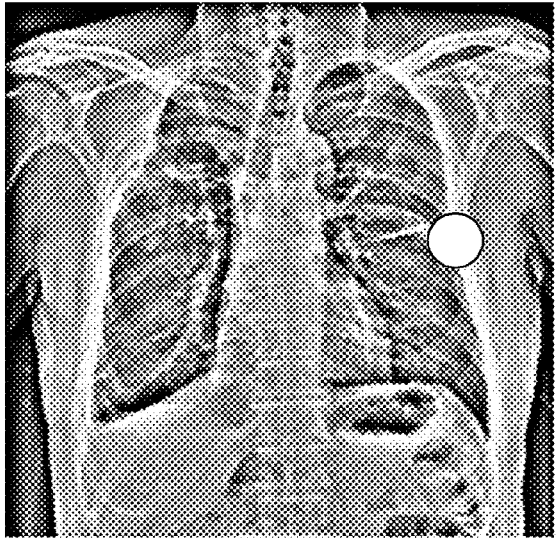
FIG. 11 is a diagram showing an output example of information regarding pleural adhesion according to the first embodiment.

For example, if the information regarding the pleural adhesion is generated by the first method in step S16, as shown in FIG. 9, the controller 31 maps the motion vector in each small region on the reference frame image (for example, frame image of maximum inspiratory level). Then, the controller 31 displays on the display 34 the motion vector in the small region which is determined that the motion amount is equal to or less than the predetermined threshold (motion decreased region) to be a color different from the color of the motion vector in the other small regions. As shown in FIG. 9, further, the specific small region or the motion vector may be displayed with emphasis such as annotations. Alternatively, as shown in FIG. 10, the color according to the motion amount may be added to each small region on the reference frame image and the result may be displayed on the display 34. As shown in FIG. 10, further, the small region which is determined that the motion amount is equal to or smaller than the predetermined threshold (motion decrease region) may be displayed with emphasis such as annotation. Alternatively, as shown in FIG. 11, a predetermined color or marker may be added on the reference frame image in the small region which is determined that the motion amount is equal to or smaller than the predetermined threshold (motion decrease region) and the result may be displayed on the display 34. With this, it is possible to emphasize the region in which the motion amount in the visceral pleura is decreased and the decrease can be shown to the user in a manner that is easy to understand.

For example, if the information regarding the pleural adhesion is generated by the second method in step S16, as shown in FIG. 11, the controller 31 adds a predetermined color or marker on the reference frame image to the small region which is determined that the difference of the motion amount from the surrounding small regions is equal to or larger than the predetermined threshold (motion amount decrease region). The controller 31 displays the result on the display 34. With this, it is possible to emphasize the region in which the motion amount in the visceral pleura is decreased and the decrease can be shown to the user in a manner that is easy to understand.

Figure 12:
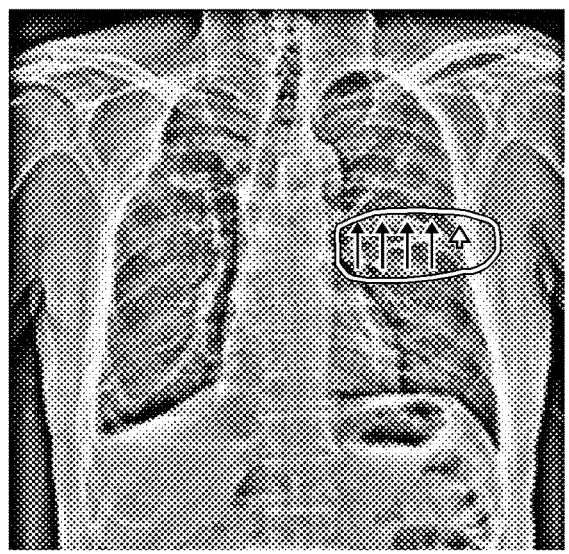
FIG. 12 is a diagram showing an output example of information regarding pleural adhesion according to the first embodiment.
Figure 13:
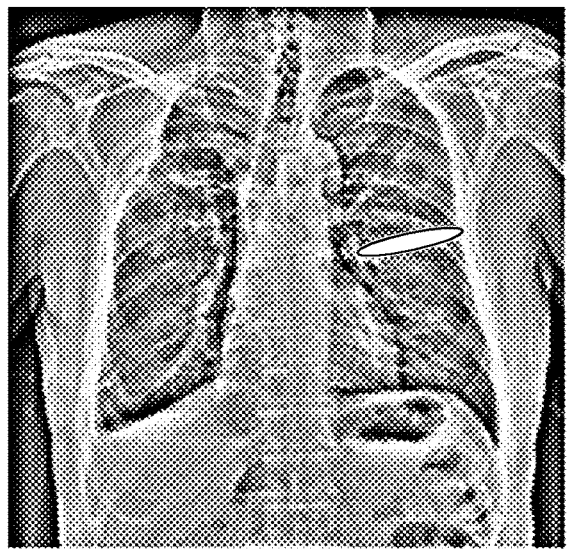
FIG. 13 is a diagram showing an output example of information regarding pleural adhesion according to the first embodiment.

Moreover, for example, if the information regarding the pleural adhesion is generated by the third method in step S16, as shown in FIG. 12, the controller 31 maps on the reference frame image the motion vector in the small region (region of interest) which is positioned on the outline of the lung region on the rib cage side, and which is determined that the difference between the motion amount of the specific small region and the motion amount in the small region with the shadow continuous to the specific small region is equal to or larger than the predetermined threshold, and another small region on the shadow continuous to the region of interest. The controller 31 displays the result on the display 34. The motion vector of the region of interest is displayed on the display 34 with a color different from the motion vector in another small region on the shadow. With this, it is possible to emphasize the region in which the motion amount in the visceral pleura is decreased and the decrease can be shown to the user in a manner that is easy to understand. Moreover, it is possible to compare the motion vectors in the region of interest and another small region on the shadow continuous to the region of interest. Alternatively, as shown in FIG. 11, a predetermined color or marker may be added to the position of the region of interest on the reference frame image, and the result may be displayed on the display 34. Further, as shown in FIG. 13, the region of interest and the small region of another shadow on the shadow continuous to the region of interest may be displayed with a marker.

Figure 14:
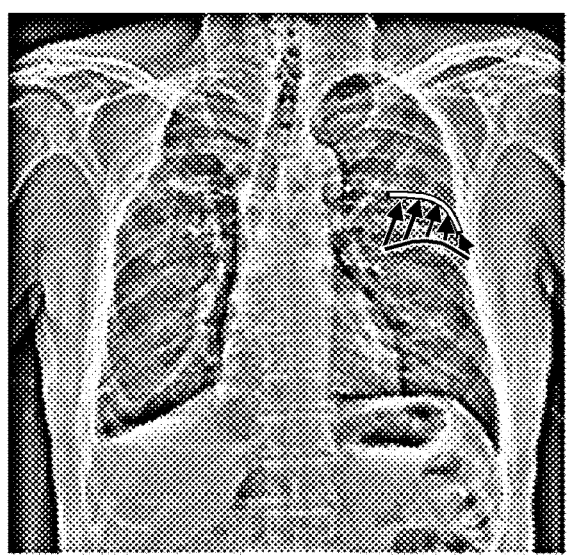
FIG. 14 is a diagram showing an output example of information regarding pleural adhesion according to the first embodiment.

For example, if the information regarding the pleural adhesion is generated by the fourth method in step S16, as shown in FIG. 14, the controller 31 maps on the reference frame image the motion vector of the small region (region of interest) which is positioned on the outline of the lung region on the rib cage side, and which is determined that the variation of the motion amount in the region including the specific small region and another small region on the shadow continuous to the specific small region is equal to or larger than the predetermined threshold and another small region on the shadow continuous to the region of interest. The controller 31 displays the result on the display 34. As shown in FIG. 14, the line connecting the starting points and the line connecting the end points of the motion vector of the small region (including small region on the outline) on the above-described continuous shadow are displayed. With this, it is possible to emphasize the region in which the motion amount in the visceral pleura is decreased and the decrease can be shown to the user in a manner that is easy to understand. Moreover, the degree of the variation of the motion amount on the shadow can be confirmed by the user.

Moreover, for example, in step S16, if the information regarding the pleural adhesion is generated using a plurality of methods from the first method to the fourth method, as shown in FIG. 11, the controller 31 adds the predetermined color or marker to the small region which is determined that the motion amount is decreased and displays the result on the display 34. With this, it is possible to emphasize the region in which the motion amount in the visceral pleura is decreased and the decrease can be shown to the user in a manner that is easy to understand.

If the process in step S17 ends, the controller 31 ends the dynamic analysis process A.

According to the above description, the motion amount in the small region in the lung region is described as the amount of the change (absolute amount) in the position of the small region from the reference frame image (for example, maximum inspiratory level frame image) but the amount may be a distance (relative amount) from the small region on the rib cage in the reference frame image. When the motion amount is a relative amount, for example, after the pre-processing in step S12 shown in FIG. 3, the optical flow is performed and the corresponding points between the adjacent frame images are obtained for each small region in the lung region. Then, the distance between the position of the small region in each frame image and the position of the small region positioned on the rib cage in the reference frame image (for example, small region which is outside the lung region and which is adjacent to the small region positioned on the outline of the lung region on the rib cage side) is to be the motion amount.

As described above, the controller 31 of the diagnostic console 3 according to the first embodiment obtains the dynamic image of the chest portion obtained by dynamic imaging by radiation. Based on the motion amount in the region including at least the region adjacent to the rib cage in the lung region of the obtained dynamic image, the controller 31 generates the information regarding the pleural adhesion. The controller 31 outputs and displays the generated information regarding the pleural adhesion on the display 34.

Consequently, it is possible to generate the information regarding the pleural adhesion using the dynamic image of the chest portion obtained by dynamic imaging by radiation. Therefore, it is possible to easily obtain the information regarding the pleural adhesion with a small amount of exposure to radiation. Conventional techniques do not have to be used, examples including a 4D-CT with problems such as the apparatus being expensive making it difficult to be introduced in a typical medical facility, the process of imaging being complicated and the amount of exposure to radiation being large, or ultrasound diagnostic apparatuses with problems such as the imaging being local and not being able to view the entire subject, amount of time of imaging becoming huge when attempting to image the entire subject and the technique of imaging being difficult. As a result, it is possible to easily obtain information regarding the pleural adhesion with a small amount of exposure to radiation without having to introduce expensive and extensive apparatuses in a typical medical facility.

Moreover, focus is placed on the region adjacent to the rib cage which is the region in which pleural adhesion occurs in the lung field in the dynamic image (region showing visceral pleura). The information regarding the pleural adhesion is generated based on the motion amount in the region including the region adjacent to the rib cage. Therefore, it is possible to obtain the information regarding the pleural adhesion more accurately compared to the conventional techniques that detect adhesion from the change in the shape of the diaphragm or the mismatch between the phases related to the diaphragm position change and the phases of breathing. By generating and outputting the information regarding the pleural adhesion for each small region, the user is able to easily understand the position and the degree that adhesions may occur. Since the surroundings of the rib cage is positioned in the periphery of the lungs, there are fewer vascular shadows than in the central lung region. However, since the band like opacity is easy to identify, the motion amount can be calculated accurately. Therefore, it is possible to reduce the possibility of overlooking the adhesion.

Second Embodiment

Next, the second embodiment according to the present invention is described.

The second embodiment describes an example in which the information regarding the pleural adhesion is generated based on a difference (or ratio, the same applies to this embodiment hereinafter) between a motion amount in a first region in a lung region and a motion amount in a second region different from the first region.

The configuration of the dynamic analysis system 100, the imaging apparatus 1, the imaging console 2, and the diagnostic console 3 according to the second embodiment are the same as the first embodiment. Therefore, the description is to be referred. Moreover, the operation of the imaging apparatus 1 and the imaging console 2 is also the same as the first embodiment. Therefore, the description is to be referred. Hereinbelow, the operation of the diagnostic console 3 according to the second embodiment is described.

According to the second embodiment, in the diagnostic console 3, when a series of frame images of a dynamic image showing the chest portion is received from the imaging console 2 through the communicator 35, the controller 31 performs a dynamic analysis process B shown in FIG. 15 in coordination with a program stored in the storage 32. The controller 31 functions as an obtainer and generator by performing the dynamic analysis process B.

In the dynamic analysis process B, the controller 31 first performs the processes in steps S21 to S25. The processes in step S21 to S25 are the same as the processes in step S11 to S15 shown in FIG. 3, and the description is to be referred.

Next, the controller 31 performs an adhesion information generating process B (step S26).

In the adhesion information generating process B in step S26, the controller 31 refers to the motion amount MAP created in step S25, and based on the difference between the motion amount in the first region in the lung region and the motion amount in the second region in the surroundings of the first region, the information regarding the pleural adhesion is generated. Specifically, the information regarding the pleural adhesion is generated by any of the following first method to fourth method.

(First Method)

According to the first method, the controller 31 calculates the difference between the motion amount in each small region (first region) in the lung region in the dynamic image and motion amount in the small region surrounding the above small region (second region, here a small region with a distance from the small region of the first region being within a predetermined range (for example, within a 30 mm radius from the center of the small region of the first region)). Then, the controller 31 determines whether the calculated difference is equal to or larger than the predetermined threshold. If it is determined that the calculated difference is equal to or larger than the predetermined threshold, the controller 31 stores the information showing that the calculated difference is equal to or larger than the predetermined threshold or the information showing that the motion amount in the specific small region is decreased in the RAM, etc. as the information regarding the pleural adhesion in the specific small region. The information is stored corresponded with the specific small region. If it is determined that the calculated difference is smaller than the predetermined threshold, the controller 31 stores the information showing that the calculated difference is not equal to or larger than the predetermined threshold or the information showing that the motion amount in the specific small region is not decreased in the RAM, etc. as the information regarding the pleural adhesion of the specific small region. The information is stored corresponded with the specific small region.

Here, the surrounding small region which is the target when the difference is obtained may be only the small region close in a vertical direction (up-down direction of the lung region), only the small region close in the horizontal direction (left-right direction of the lung region) or the small region close in both directions. When there are a plurality of surrounding small regions, the motion amount in the surrounding small regions is to be a representative value of the motion amount in the surrounding plurality of small regions. Moreover, a value verified in clinical experiments is used as the predetermined threshold compared with the calculated difference.

(Second Method)

In the second method, the controller 31 divides the lung region in the dynamic image to a plurality of blocks in a predetermined direction (for example, up-down direction, left-right direction, or up-down and left-right direction of the lung field) and generates the information regarding the pleural adhesion based on the difference of the motion amount between the motion amount in each block (first region) and the motion amount in the block adjacent to the above specific block (second region) or whether the difference is equal to or larger than a predetermined threshold.

For example, the controller 31 divides the lung region in the dynamic image to a plurality of blocks in a predetermined direction. The representative value of the motion amount in the small region included in each block is calculated as the motion amount in each block. The representative value of the motion amount in the small region included in the block adjacent to the above block is calculated as the motion amount in the adjacent block. Then, the difference between the representative value of the small region included in each block and the representative value of the motion amount in the small region included in the block adjacent to the above specific block is calculated. Then, if it is determined that the calculated difference is equal to or larger than the predetermined threshold, the controller 31 stores the information showing that the calculated difference is equal to or larger than the predetermined value or the information showing that the motion amount in the specific block (first region) is decreased in the RAM, etc. as the information regarding the pleural adhesion of the specific block. The information is stored corresponded with the specific block. If the calculated difference is determined to be smaller than the predetermined threshold, the controller 31 stores the information showing that the calculated difference is not equal to or larger than the predetermined threshold or the information showing that the motion amount in the specific block (first region) is not decreased in the RAM, etc. as the information regarding the pleural adhesion of the specific block. The information is stored corresponded with the specific block. A value obtained in clinical experiments is used as the above-described predetermined threshold.

The adjacent block with which the difference is obtained may be a block adjacent in the vertical direction, a block adjacent in the horizontal direction or blocks adjacent in the vertical direction and the horizontal direction. The difference of the motion amount between the adjacent block is the representative value of the difference of the motion amount obtained between each block among the plurality of adjacent blocks which are the targets with which the difference is to be obtained. When the difference of the motion amount between the blocks adjacent in the vertical direction and the horizontal direction is obtained, the difference in the vertical direction and the difference in the horizontal direction may be calculated separately, or the value may be integrated.

Figure 16A:
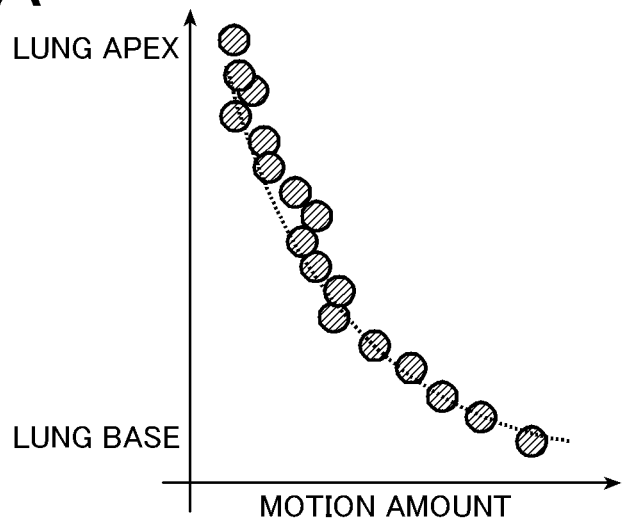
FIG. 16A is a graph plotting a motion amount (representative value) of each block in a vertical direction when there is no adhesion.
Figure 16B:
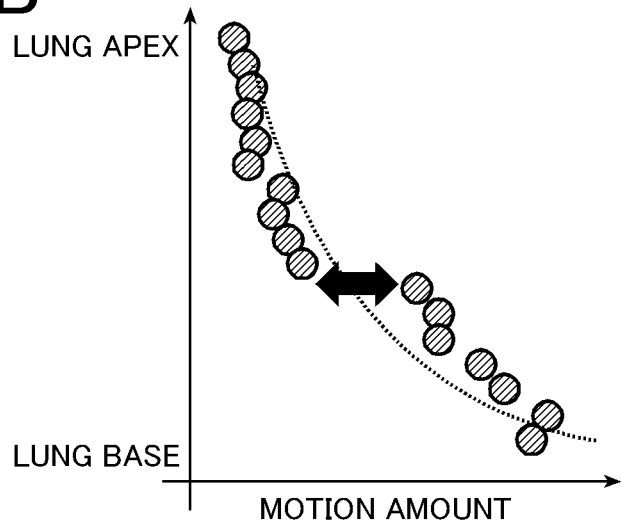
FIG. 16B is a graph plotting the motion amount (representative value) of each block in a vertical direction when there is adhesion.

FIG. 16A is an example of a graph plotting a motion amount of each block (representative value of motion amount in each block) in which a lung region with no region in which the motion is decreased due to adhesion is divided in a vertical direction at a predetermined interval. The motion amount in each block is plotted in a space in which a horizontal axis shows the motion amount and the vertical axis shows the position of the lung region in the vertical direction. FIG. 16B is an example of a graph plotting the motion amount in each block (representative value of the motion amount in each block) dividing the lung region with the adhesion in a vertical direction. The motion amount is plotted in a space in which the horizontal axis shows the motion amount and the vertical axis shows the position of the lung region in the vertical direction. As shown in FIG. 16A, it is possible to understand that if there is no adhesion, the motion amount gradually becomes larger as the position of the block becomes lower. Turning to FIG. 16B, if there is adhesion, the difference in the motion amount between adjacent blocks becomes large in the position with adhesion (position shown with an arrow).

As described above, it is possible to determine by the degree of the difference in the motion amount between the adjacent block whether there is a region in which the motion is decreased due to adhesion.

Preferably, in the second method, the lung region is divided in a certain direction, specifically, the up-down direction of the lung field. The motion of the lungs is dominated by the motion of the diaphragm. Therefore, it is easier to show the motion of the lungs by dividing the lung region in the up-down direction. Moreover, preferably, the predetermined threshold used to compare the difference between the motion amount in each block and the motion amount in the block adjacent to the above specific block is changed according to the position in the lung region. For example, the motion amount in the upper lung field is small and the motion amount in the lower lung field is large.

Therefore, preferably, the threshold in the upper lung field is small and the threshold in the lower lung field is large.

(Third Method)

In the third method, the controller 31 calculates the variation (standard deviation or variance) of the difference as described in the second method which is the difference between the motion amount in each block (representative value of motion amount in the small regions included in each block) and the motion amount in the adjacent block with which the above described difference is obtained (representative value of motion amount in the small regions included in the adjacent block). The controller 31 stores the result of the above calculated variation in the RAM, etc. as the information regarding the pleural adhesion. Alternatively, the calculated variation is compared with the predetermined threshold, and if it is determined that the calculated variation is equal to or larger than the predetermined threshold, the controller 31 stores the information showing that the calculated variation is equal to or larger than the predetermined threshold or the information showing that there is a region in which the motion amount in the lung region is decreased in the RAM, etc. as the information regarding the pleural adhesion. If it is determined that the calculated variation is smaller than the predetermined threshold, the controller 31 stores the information showing that the calculated variation is not equal to or larger than the predetermined threshold or the information showing that the motion amount in the lung region is not decreased in the RAM, etc. as the information regarding the pleural adhesion. A value obtained in clinical experiments is used as the above-described predetermined threshold.

(Fourth Method)

In the fourth method, the controller 31 calculates the difference between the motion amount in each small region (first region) in the lung region in the dynamic image and the motion amount in the small region (second region) positioned in the same position as the above specific small region in the left or right lung different from the lung in which the specific small region exists. Then, the controller 31 generates the calculated result as the information regarding the pleural adhesion. The calculated difference is compared with the predetermined threshold. If it is determined that the calculated difference is equal to or larger than the predetermined threshold, the controller 31 stores the information showing that the calculated difference is equal to or larger than the predetermined threshold or the information showing that the motion amount of the specific small region (first region) is decreased in the RAM, etc. as the information regarding the pleural adhesion in the specific small region. The information is stored corresponded with the specific small region. If it is determined that the calculated difference is smaller than the predetermined threshold, the controller 31 stores information showing that the calculated difference is not equal to or larger than the predetermined threshold or the information showing that the motion amount in the specific small region (first region) is not decreased in the RAM, etc. as the information regarding the pleural adhesion in the specific small region. The information is stored corresponded with the specific small region. A value verified in clinical experiments is used as the predetermined threshold compared with the calculated difference.

According to the pleural information generating process B, even in cases in which the motion of the lungs or the body movement is large and it is difficult to determine the decrease in the motion amount in each small region, by obtaining the difference in the motion amount between a plurality of small regions or blocks including a plurality of small regions, it is possible to accurately detect the region in which the motion amount is decreased by adhesion. Depending on the position of the lung region (for example, lung apex or lung base), the degree and the direction of the motion is different. Therefore, by obtaining the difference between the surrounding regions or the regions in the same position in the left and right lung, it is possible to accurately detect the decrease in the motion amount.

When the adhesion information generating process B in step S26 shown in FIG. 9 ends, the controller 31 outputs the generated information regarding the pleural adhesion (step S27).

The generated information regarding the pleural adhesion may be output as text or numeric values, or the information may be output with color added on an image according to the text or the numeric values.

Figure 17:
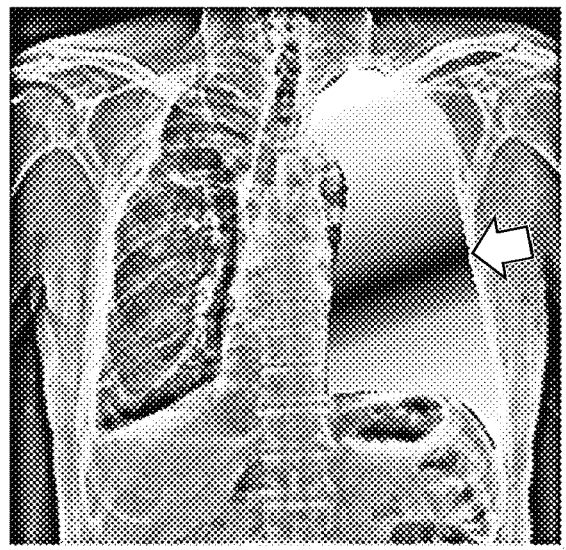
FIG. 17 is a diagram showing an output example of information regarding pleural adhesion according to the second embodiment.
Figure 18:
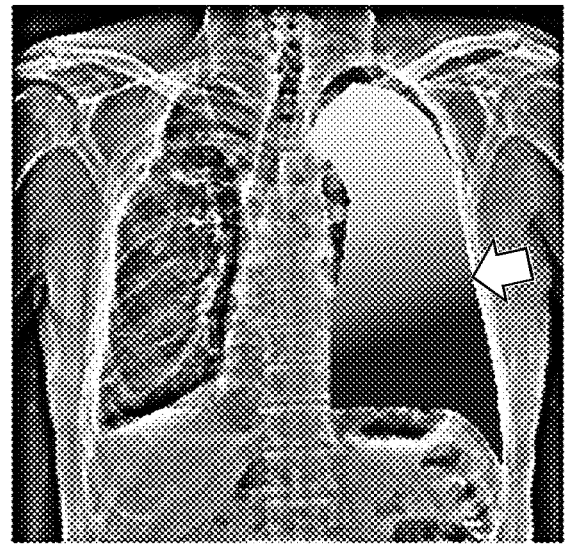
FIG. 18 is a diagram showing the motion amount in each small region.
Figure 19:
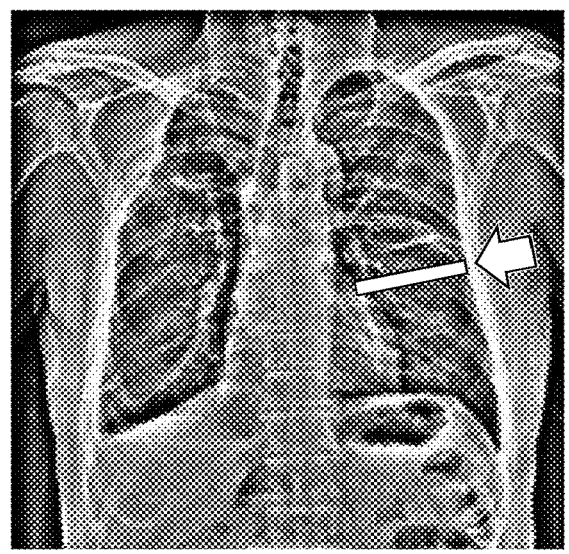
FIG. 19 is a diagram showing an output example of information regarding pleural adhesion according to the second embodiment.

For example, when the information regarding the pleural adhesion is generated by the first method in step S26, as shown in FIG. 17, the controller 31 adds color according to the difference between the motion amount in the specific small region and the motion amount in the surrounding small region in each small region on the reference frame image and displays the result on the display 34. In addition to the above, as shown in FIG. 18, the color may be added to each small region on the reference frame image according to the motion amount in the specific small region and the result may be displayed on the display 34. Alternatively, as shown in FIG. 19, display with emphasis may be performed by adding the color only to the small region on the reference frame image when the difference from the motion amount of the surrounding small region is equal to or larger than a predetermined threshold. With this, the motion decrease region where there may be the adhesion is highlighted and the region can be shown to the user in a manner that is easy to understand.

Figure 20:
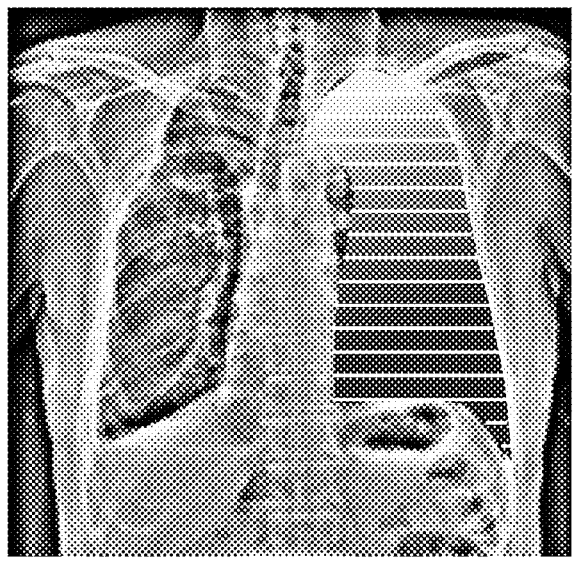
FIG. 20 is a diagram showing an output example of information regarding pleural adhesion according to the second embodiment.

For example, when the information regarding the pleural adhesion is generated by the second method in step S26, the controller 31 adds the color to each block on the reference frame image according to the difference between the motion amount of the specific block and the motion amount of the adjacent block and displays the result on the display 34. As shown in FIG. 20, together with the above, the color may be added to each block on the reference frame image according to the motion amount of the specific block and the result is displayed on the display 34. Alternatively, display with emphasis may be performed by adding a predetermined color to the block on the reference frame image when the difference between the motion amount in the adjacent block is equal to or larger than the predetermined threshold. With this, the motion decrease region where there may be the adhesion is highlighted and the region can be shown to the user in a manner that is easy to understand.

For example, when the information regarding the pleural adhesion is generated by the third method in step S26, the controller 31 displays the information regarding the pleural adhesion by a numeric value, for example, on the display 34. Moreover, a color according to the difference calculated for the specific block may be added to each block in the reference frame image, and the result may be displayed on the display 34. With this, it is possible to show that there is the motion decrease region where there may be the adhesion in the lung region in a manner that is easy to understand for the user.

For example, if the information regarding the pleural adhesion is generated by the fourth method shown in step S26, the controller 31 adds the color in each small region in the reference frame image according to the difference between the motion amount in the specific small region and the motion amount in the small region in the position the same as the specific small region in the left or right lung region different from the specific small region. The result is displayed on the display 34. Alternatively, the predetermined color may be added to the small region in the reference frame image when the difference between the motion amount in another small region in the position the same as the small region in the left or right lung region different from the small region is equal to or larger than the predetermined threshold. With this, the display with emphasis can be performed. With this, the region where there may be the adhesion is highlighted and the region can be shown to the user in a manner that is easy to understand.

As described above, the controller 31 of the diagnostic console 3 according to the second embodiment obtains the dynamic image of the chest portion obtained by the dynamic imaging by radiation. Based on the difference or the ratio between the motion amount of the first region in the lung region in the obtained dynamic image and the motion amount of the second region different from the first region, the controller 31 generates the information regarding the pleural adhesion. The controller 31 outputs and displays the generated information regarding the pleural adhesion on the display 34.

Consequently, it is possible to generate the information regarding the pleural adhesion using the dynamic image of the chest portion obtained by dynamic imaging by radiation Therefore, it is possible to easily obtain the information regarding the pleural adhesion with a small amount of exposure to radiation. Conventional techniques do not have to be used, examples including a 4D-CT with problems such as the apparatus being expensive making it difficult to be introduced in a typical medical facility, the process of imaging being complicated and the amount of exposure to radiation being large, or ultrasound diagnostic apparatuses with problems such as the imaging being local and not being able to view the entire subject, amount of time of imaging becoming huge when attempting to image the entire subject and the technique of imaging being difficult. As a result, it is possible to easily obtain information regarding the pleural adhesion with a small amount of exposure to radiation without having to introduce expensive and extensive apparatuses in a typical medical facility.

The information regarding the pleural adhesion is generated based on the difference or the ratio of the motion amount among a plurality of regions (for example, among small regions or among blocks including a plurality of small regions) in the lung region in the dynamic image. Therefore, even if the motion of the lungs and the motion of the body is large and it is difficult to determine the decrease of the motion amount in each region, the information regarding the pleural adhesion can be obtained easily and accurately with a small amount of exposure to radiation. Compared to the conventional technique in which the adhesion is detected by a change in the shape of the diaphragm or the mismatch between the phases related to the diaphragm position change and the phases of breathing, the information regarding the plural adhesion can be obtained accurately. By generating and outputting the information regarding the pleural adhesion for each small region or each block, the user is able to easily understand the position and the degree that adhesion may occur.

Third Embodiment

Next, the third embodiment according to the present invention is described.

The third embodiment describes the example in which the information regarding the pleural adhesion is generated based on the threshold and the motion amount in the region not including the region adjacent to the rib cage in the lung region.

The configurations of the dynamic analysis system 100, the imaging apparatus 1, the imaging console 2, and the diagnostic console 3 according to the third embodiment are the same as the first embodiment. Therefore, the description is to be referred. Moreover, the operation of the imaging apparatus 1 and the imaging console 2 is also the same as the first embodiment. Therefore, the description is to be referred. Hereinbelow, the operation of the diagnostic console 3 according to the third embodiment is described.

Figure 21:
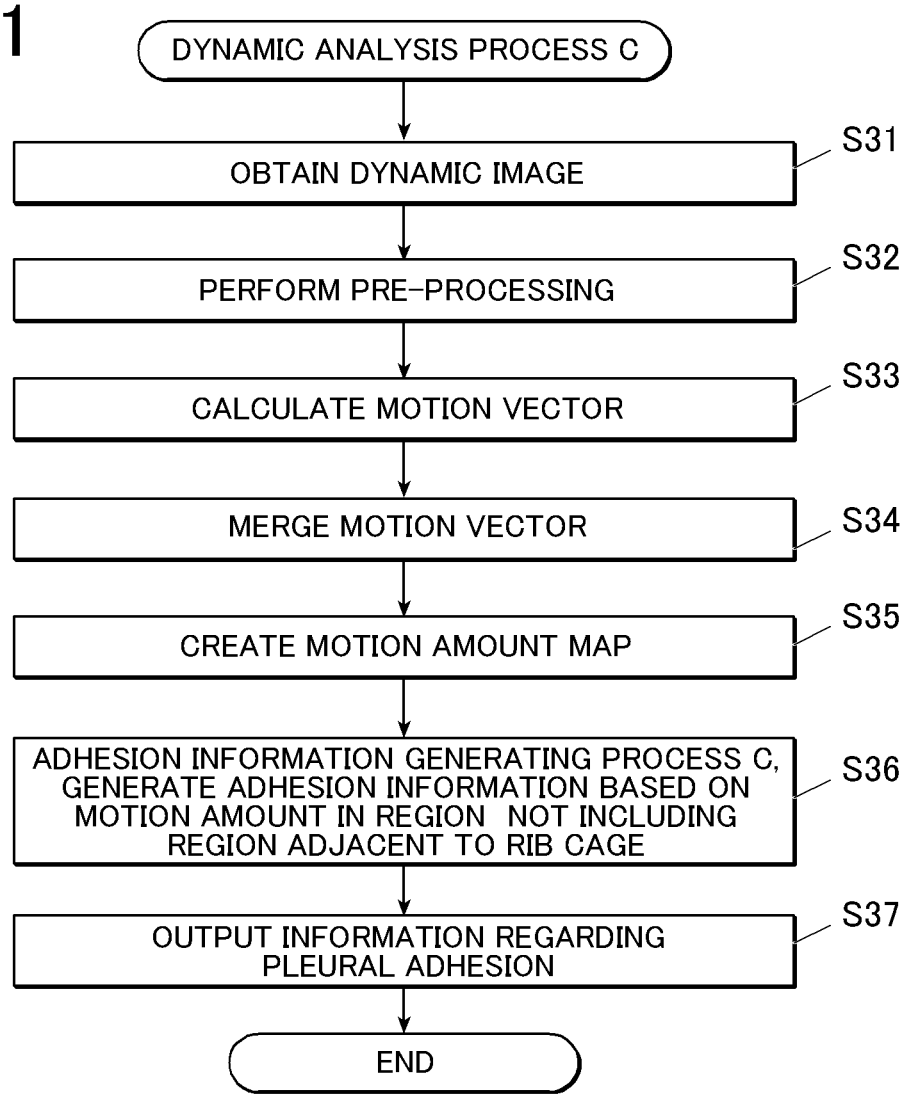
FIG. 21 is a flowchart showing a dynamic analysis process C performed by the controller of the diagnostic console shown in FIG. 1 according to the third embodiment.

According to the third embodiment, in the dynamic console 3, when a series of frame images of a dynamic image showing the chest portion is received from the imaging console 2 through the communicator 35, the controller 31 performs a dynamic analysis process C shown in FIG. 21 in coordination with the program stored in the storage 32. The controller 31 functions as the obtainer and the generator when the dynamic analysis process C is performed.

In the dynamic analysis process C, first, the controller 31 performs the processes in steps S31 to S35. The processes in steps S31 to S35 are the same as the processes in steps S11 to S15 shown in FIG. 3, and the description is to be referred.

Next, the controller 31 performs the adhesion information generating process C (step S36).

In step S36 of the adhesion information generating process C, the controller 31 refers to the motion amount MAP created in step S35, and generates the information regarding the pleural adhesion based on the motion amount in the region not including the region adjacent to the rib cage in the lung region.

For example, in the adhesion information generating process C, the controller 31 determines for each small region in the lung region with the exception of the small region positioned on the outline of the lung region on the rib cage side in the dynamic image whether the motion amount in the specific small region is equal to or smaller than a predetermined threshold. If it is determined that the motion amount is equal to or smaller than the predetermined threshold, the information showing that the motion amount of the specific small region is equal to or smaller than the predetermined threshold or the information showing that the motion amount in the specific small region is decreased is stored in the RAM, etc. as the information regarding the pleural adhesion in the specific small region. The information is stored corresponded with the small region. If it is determined that the motion amount is larger than the predetermined threshold, the controller 31 stores the information showing that the motion amount in the specific small region is not equal to or smaller than the predetermined threshold (exceeds the predetermined threshold) or the information showing that the motion amount in the specific small region is not decreased in the RAM, etc. as the information regarding the pleural adhesion in the specific small region. The information is stored corresponded with the small region.

A value verified in clinical experiments is used as the predetermined threshold compared with the motion amount in the small region.

In the region in which there is pleural adhesion, the motion amount is small compared to the other regions.

According to the adhesion information generating process C, it is determined whether the motion amount is equal to or smaller than the predetermined threshold for each small region in the lung region other than the small region positioned on the outline of the lung region on the rib cage side in the dynamic image. If it is determined that the motion amount is equal to or smaller than the predetermined threshold, it is determined that there is a possibility that there is an adhesion in the specific small region, and the information regarding the pleural adhesion is generated based on the determined result. Therefore, it is possible to easily and accurately generate the information regarding the pleural adhesion in the lung region on the stomach side or the back side of the body with a small amount of exposure to radiation.

If the adhesion information generating process C ends in step S36 shown in FIG. 21, the controller 31 outputs the generated information regarding the pleural adhesion (step S37).

The generated information regarding the pleural adhesion may be output as text or numeric values, or the information may be output with color added on an image according to the text or the numeric values.

For example, the color is added according to the motion amount based on the motion vector in each small region in the reference frame image and the result is displayed on the display 34. Alternatively, the motion vector is mapped in each small region in the reference frame image. The motion vector of the small region in which the motion amount is equal to or smaller than the predetermined threshold is displayed on the display 34 with a color different from the motion vector in the other small region. Alternatively, the small region in which the motion amount is equal to or smaller than the predetermined threshold is displayed with emphasis such as by annotation. Alternatively, a predetermined color or marker is added to the small region in which the motion amount is equal to or smaller than the predetermined threshold in the reference frame image, and the result is displayed on the display 34. With this, the region in which there is a possibility of adhesion and the motion amount is decreased can be shown with emphasis to the user in a manner that is easy to understand.

As described above, the controller 31 of the diagnostic console 3 according to the third embodiment obtains the dynamic image of the chest portion obtained by the dynamic imaging by the radiation. Based on the motion amount in the region not including the region adjacent to the rib cage in the lung region in the obtained dynamic image, the information regarding the pleural adhesion is generated, and the generated information regarding the pleural adhesion is output and displayed on the display 34.

Consequently, it is possible to generate the information regarding the pleural adhesion using the dynamic image of the chest portion obtained by dynamic imaging by radiation Therefore, it is possible to easily obtain the information regarding the pleural adhesion with a small amount of exposure to radiation. Conventional techniques do not have to be used, examples including a 4D-CT with problems such as the apparatus being expensive making it difficult to be introduced in a typical medical facility, the process of imaging being complicated and the amount of exposure to radiation being large, or ultrasound diagnostic apparatuses with problems such as the imaging being local and not being able to view the entire subject, amount of time of imaging becoming huge when attempting to image the entire subject and the technique of imaging being difficult. As a result, it is possible to easily obtain information regarding the pleural adhesion with a small amount of exposure to radiation without having to introduce expensive and extensive apparatuses in a typical medical facility.

The information regarding the pleural adhesion is generated based on the motion amount in the region not including the region adjacent to the rib cage in the lung region in the dynamic image. Therefore, it is possible to easily and accurately generate the information regarding the pleural adhesion in the lung region on the stomach side or the back side of the body with a small amount of exposure to radiation compared to the conventional techniques that detect adhesion from the change in the shape of the diaphragm or the mismatch between the phases related to the diaphragm position change and the phases of breathing. According to the third embodiment, when there is an adhesion, the decrease in the motion amount can be seen in a wide range of the lungs. Therefore, the user is able to intuitively determine whether there is adhesion, and this enhances efficiency of reading the image. By generating and outputting the information regarding the pleural adhesion for each small region, the user is able to easily understand the position and the degree where adhesion may occur.

Fourth Embodiment

Next, the fourth embodiment according to the present embodiment is described.

According to the fourth embodiment, the above-described adhesion information generating process A, the adhesion information generating process B, and the adhesion information generating process C are performed in order. Based on the information regarding the pleural adhesion generated in the adhesion information generating process A to the adhesion information generating process C, the adhesion is determined collectively.

The configurations of the dynamic analysis system 100, the imaging apparatus 1, the imaging console 2, and the diagnostic console 3 according to the fourth embodiment are the same as the first embodiment. Therefore, the description is to be referred. Moreover, the operation of the imaging apparatus 1 and the imaging console 2 is also the same as the first embodiment. Therefore, the description is to be referred. Hereinbelow, the operation of the diagnostic console 3 according to the fourth embodiment is described.

According to the fourth embodiment, in the diagnostic console 3, when a series of frame images of a dynamic image showing the chest portion is received from the imaging console 2 through the communicator 35, the controller 31 performs a dynamic analysis process D shown in FIG. 22 in coordination with the program stored in the storage 32. The controller 31 functions as the obtainer, generator, second generator, third generator, determiner and calculator by performing the dynamic analysis process D.

In the dynamic analysis process D, first, the controller 31 performs the processes in steps S41 to S45. The processes in steps S41 to S45 are the same as the processes in steps S11 to S15 shown in FIG. 3, and the description is to be referred.

Next, the controller 31 performs the adhesion information generating process A (step S46).

Next, the controller 31 performs the adhesion information generating process B (step S47).

Next, the controller 31 performs the adhesion information generating process C (step S48).

Next, the controller 31 determines whether there is a possibility that there is adhesion in the lung region in the dynamic image based on the information regarding the pleural adhesion generated in the adhesion information generating processes A to C (step S49).

For example, if the information showing that the motion amount is decreased is included in the information regarding the pleural adhesion generated in at least one or more of the adhesion information generating processes A to C, the controller 31 determines that there is a possibility of adhesion in the lung region in the dynamic image.

In order to enhance the sensitivity to detect the adhesion, it is possible to determine that there is a possibility that there is adhesion in the lung region if there is information showing that the motion amount is decreased in the information regarding the pleural adhesion generated in at least one or more of the adhesion information generating processes A to C. Alternatively, in order to enhance the specificity, it may be determined that there is adhesion in the lung region if there is information showing that the motion amount is decreased in the information regarding the pleural adhesion generated in at least two or more of the adhesion information generating processes A to C.

Next, the controller 31 calculates a degree of certainty (reliability level) regarding the determination in step S49 based on the number of sets of information showing that the motion amount decreased in the lung region (small region) included in the information regarding the pleural adhesion generated in the adhesion information generating processes A to C (step S50).

For example, in the information regarding the pleural adhesion generated in the processes in the adhesion information generating processes A to C, 1 is counted if information showing that the motion amount is decreased is included in the information regarding the pleural adhesion in at least one small region, and the total number of counts of the adhesion information generating processes A to C is calculated. The processes in the adhesion information generating process A and the adhesion information generating process C are performed on different regions. Therefore, there is no small region in which the motion amount is determined to be decreased in both processes, and the number of counts is 2 at maximum. The calculated total number of counts/maximum number of counts (here, 2) is calculated as the degree of certainty of the determination That is, the degree of certainty is 0, ½=50%, 2/2=100%. The number of counts in the adhesion information generating processes A to C can be weighted. For example, since there is a possibility that it is determined that the motion amount is decreased in a wide range in the adhesion information generating process C, the weight is double compared to the adhesion information generating processes A and B.

Alternatively, the number of sets of information showing that the motion amount is decreased included in the information regarding the pleural adhesion generated in the adhesion information generating processes A to C is counted (maximum, 2) for each small region, and the total number of counts/maximum number of counts (here, 2) can be calculated as the degree of certainty in the determination in the specific small region (0, ½=50%, 2/2=100%). As described above, the number of counts in the adhesion information generating processes A to C may be weighted.

Then, the controller 31 outputs the result of determination regarding the possibility of the adhesion and the degree of certainty (step S51).

For example, the result of determination determined in step S49 and the degree of certainty calculated in step S50 are displayed on the display 34. The information regarding the pleural adhesion generated in the adhesion information generating processes A to C may also be displayed.

As described above, the controller 31 of the diagnostic console 3 according to the fourth embodiment determines the possibility of the pleural adhesion based on the information regarding the pleural adhesion generated by the adhesion information generating processes A to C and outputs the result. Therefore, the user is able to easily determine whether or not there is adhesion in the lung region.

The description according to the first to fourth embodiments are merely one suitable example of the present invention and the present invention is not limited to the above.

For example, according to the present embodiment, the display 34 is described to be the outputter and the information regarding the pleural adhesion is displayed on the display 34. Alternatively, for example, the communicator 35 may be the outputter, and the information regarding the pleural adhesion may be output to the external apparatus by the communicator 35. The information regarding the pleural adhesion may be displayed output or printed in the external apparatus.

According to the above description, a hard disk, a non-volatile semiconductor memory or the like is used as a computer readable medium of the programs of the present invention. However, the present invention is not limited to the above. A portable recording medium such as a CD-ROM can be applied as other computer readable mediums. A carrier wave is also applied as a medium providing the program data according to the present invention via a communication line.

In addition to the above, detailed configurations and detailed operation of the components of the dynamic analysis system can also be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims

What is claimed is:

1. A dynamic image analysis apparatus comprising:
a hardware processor; and
an outputter,
wherein the hardware processor obtains a dynamic image of a chest portion obtained by dynamic imaging by radiation,
wherein the hardware processor divides the lung region in the dynamic image into small regions including one or a plurality of pixels,
wherein the hardware processor performs a generating process in which information regarding pleural adhesion is generated based on a motion amount in each small region of the small regions excepting in a region adjacent to a rib cage in a lung region in the dynamic image, and
wherein the outputter outputs the generated information regarding the pleural adhesion.

2. The dynamic image analysis apparatus according to claim 1, wherein the region adjacent to the rib cage is a region on an outline of a lung region on a rib cage side in the dynamic image.

3. The dynamic image analysis apparatus according to claim 1, wherein the region adjacent to the rib cage is a region showing a visceral pleura.

4. The dynamic image analysis apparatus according to claim 3, wherein, in the first generating process, the hardware processor compares a motion amount in the region showing the visceral pleura and a motion amount of a region different from the region showing the visceral pleura in the lung region and generates information showing whether the motion amount of the visceral pleura is decreased as the information regarding the pleural adhesion.

5. The dynamic image analysis apparatus according to claim 1, wherein the motion amount is an amount of change in a position from a reference frame image in the dynamic image.

6. The dynamic image analysis apparatus according to claim 1, wherein the motion amount is a distance between a small region on a rib cage in a reference frame image in the dynamic image.

7. The dynamic image analysis apparatus according to claim 1, wherein, in the generating process, the hardware processor determines whether the motion amount in the each small region of the small regions excepting in the region adjacent to the rib cage in the lung region is equal to or smaller than a predetermined threshold, and based on a determined result, generates information showing whether the motion amount in the each small region of the small regions excepting in the region adjacent to the rib cage in the lung region is equal to or smaller than the predetermined threshold or information showing whether the motion amount in the each small region of the small regions excepting in the region adjacent to the rib cage in the lung region is decreased as the information regarding the pleural adhesion.

8. The dynamic image analysis apparatus according to claim 1, wherein the dynamic image is a dynamic image imaged in a breathing state.

9. A non-transitory computer-readable storage medium storing a program causing a computer to perform:
   obtaining a dynamic image of a chest portion obtained by dynamic imaging by radiation;
   dividing the lung region in the dynamic image into small regions including one or a plurality of pixels
   generating information regarding pleural adhesion based on a motion amount in each small region of the small regions excepting in a region adjacent to a rib cage in a lung region in the dynamic image; and
   outputting the generated information regarding the pleural adhesion.

\* \* \* \* \*